United States Patent
Guo et al.

(10) Patent No.: US 12,186,710 B2
(45) Date of Patent: Jan. 7, 2025

(54) NANOSTRUCTURED MEMBRANE FILTER SYSTEM FOR RAPID PURIFICATION OF WATER

(71) Applicant: VERSITECH LTD., Hong Kong (CN)

(72) Inventors: Hao Guo, Hong Kong (CN); Xianhui Li, Hong Kong (CN); Chuyang Tang, Hong Kong (CN)

(73) Assignee: VERSITECH LIMITED, Hong Kong (CN)

(*) Notice: Subject to any disclaimer, the term of this patent is extended or adjusted under 35 U.S.C. 154(b) by 538 days.

(21) Appl. No.: 17/310,728

(22) PCT Filed: Apr. 6, 2020

(86) PCT No.: PCT/CN2020/083416
§ 371 (c)(1),
(2) Date: Aug. 19, 2021

(87) PCT Pub. No.: WO2020/207361
PCT Pub. Date: Oct. 15, 2020

(65) Prior Publication Data
US 2022/0184562 A1    Jun. 16, 2022

Related U.S. Application Data

(60) Provisional application No. 62/831,382, filed on Apr. 9, 2019.

(51) Int. Cl.
*B01D 69/12* (2006.01)
*B01D 61/02* (2006.01)
(Continued)

(52) U.S. Cl.
CPC .......... *B01D 69/12* (2013.01); *B01D 61/027* (2013.01); *B01D 67/00042* (2022.08);
(Continued)

(58) Field of Classification Search
CPC .................. B01D 69/12; B01D 61/027; B01D 67/00042; B01D 67/0079; B01D 69/125;
(Continued)

(56) References Cited

U.S. PATENT DOCUMENTS

| | | |
|---|---|---|
| 2008/0272050 A1 | 11/2008 | Butters et al. |
| 2013/0118973 A1 | 5/2013 | Seo et al. |
| 2020/0016545 A1 | 1/2020 | Seo et al. |

FOREIGN PATENT DOCUMENTS

| | | |
|---|---|---|
| CN | 2219888 Y | 2/1996 |
| CN | 101298026 A | 11/2008 |

(Continued)

OTHER PUBLICATIONS

Translation of Jiang (CN105013336A) (Year: 2015).*
(Continued)

*Primary Examiner* — Ekandra S. Miller-Cruz
(74) *Attorney, Agent, or Firm* — SALIWANCHIK, LLOYD & EISENSCHENK

(57) ABSTRACT

A nanostructured composite membrane filter for rapid water purification and methods for preparing the nanostructured composite membrane filter are provided. The nanostructured composite membrane includes a silver layer having a plurality of silver functionalized nanofibers for disinfecting microorganisms of water, and a chemical modified layer having a plurality of chemical modified nanofibers for removing impurities from the water. The plurality of silver functionalized nanofibers includes a plurality of polyvinyl alcohol (PVA) nanofibers coated with polydopamine (PDA) and silver, and each of the plurality of chemical modified nanofibers includes a polymer matrix such as polyvinyl alcohol (PVA) and anionic polyelectrolytes such as poly (sodium styrenesulfonate) (PSSNa) for capturing metal ions of the water.

12 Claims, 25 Drawing Sheets

(51) Int. Cl.
   *B01D 67/00* (2006.01)
   *B01D 71/02* (2006.01)
   *B01D 71/28* (2006.01)
   *B01D 71/38* (2006.01)
   *B01D 71/60* (2006.01)
   *B01D 71/66* (2006.01)
   *C02F 1/44* (2023.01)
   *C02F 101/10* (2006.01)

(52) U.S. Cl.
   CPC ....... *B01D 67/0079* (2013.01); *B01D 69/125* (2013.01); *B01D 71/022* (2013.01); *B01D 71/281* (2022.08); *B01D 71/381* (2022.08); *B01D 71/60* (2013.01); *B01D 71/66* (2013.01); *C02F 1/442* (2013.01); *B01D 2323/30* (2013.01); *B01D 2323/39* (2013.01); *C02F 2101/10* (2013.01); *C02F 2303/04* (2013.01)

(58) Field of Classification Search
   CPC ................ B01D 71/022; B01D 71/281; B01D 71/381; B01D 71/60; B01D 71/66; B01D 2323/30; B01D 2323/39; B01D 67/00043; B01D 67/0006; B01D 2325/08; B01D 2325/14; B01D 65/08; B01D 69/02; B01D 2325/48; C02F 1/442; C02F 2101/10; C02F 2303/04; C02F 1/288; C02F 2101/20; C02F 1/505; C02F 1/44
   USPC ................................................... 210/500.25
   See application file for complete search history.

(56) References Cited

FOREIGN PATENT DOCUMENTS

| | | | | |
|---|---|---|---|---|
| CN | 102248726 | A | | 11/2011 |
| CN | 102458618 | A | | 5/2012 |
| CN | 203807211 | U | | 9/2014 |
| CN | 105013336 | A | | 11/2015 |
| CN | 105789448 | A | | 7/2016 |
| CN | 108654394 | A | * | 10/2018 ......... B01D 67/0002 |
| CN | 109789377 | A | * | 5/2019 ......... B01D 63/081 |
| WO | WO-2010/055274 | A1 | | 5/2010 |
| WO | WO-2012/036550 | A1 | | 3/2012 |
| WO | WO-2014/206735 | A1 | | 12/2014 |
| WO | WO-2018/110986 | A1 | | 6/2018 |

OTHER PUBLICATIONS

Translation of Chen (CN108654394A) (Year: 2018).*
Translation of Wang (CN109789377A) (Year: 2019).*
Wang, X. et al., "Poly(ethyleneimine) nanofibrous affinity membrane fabricated via one step wet-electrospinning from poly(vinyl alchohol)-doped poly(ethyleneimine) solution system and its application," *Journal of Membrane Science*, 2011, 379:191-199, Elsevier B.V.
Kampalanonwat, P. et al., "Preparation and Adsorption Behavior of Aminated Electrospun Polyacrylonitrile Nanofiber Mats for Heavy Metal Ion Removal," *ACS Applied Materials & Interfaces*, 2010, 2(12):3619-3627, American Chemical Society.
Min, M. et al., "Micro-nano structure poly( ether sulfones)/poly( ethyleneimine) nanofibrous affinity membranes for adsorption of anionic dyes and heavy metal ions in aqueous solution," *Chemical Engineering Journal*, 2012, 197:88-100, Elsevier B.V.
Prabhu, R. N. et al., "Development of a portable filter for arsenic removal from drinking water," *Int. J. Water.*, 2001, 1(2):217-227, Inderscience Enterprises Ltd.
El-Harbawi, M. et al., "Design of a Portable Dual Purposes Water Filter System," *Journal of Engineering Science and Technology*, 2010, 5(2):165-175, School of Engineering, Taylor's University College.
Wang, J. et al., "A novel gravity-driven nanofibrous membrane for point-of-use water disinfection: polydopamine-induced in situ silver incorporation," *Scientific Reports*, 2017, 7:1-8.
International Search Report dated Jun. 23, 2020 in International Application No. PCT/CN2020/0083416.
International Search Report and Written Opinion dated Jun. 23, 2020 in International Application No. PCT/CN2020/083416.
Office Action dated Nov. 3, 2022 in Chinese Application No. 202080015455.4.
Search Report dated Oct. 29, 2022 in Chinese Application No. 2020800154554.
Office Action dated Mar. 22, 2023 in Chinese Application No. 202080015455.4.

* cited by examiner

NANOSTRUCTURED MEMBRANE FILTER SYSTEM FOR RAPID PURIFICATION OF WATER

CROSS-REFERENCE TO RELATED APPLICATIONS

This application is the U.S. national stage application of International Patent Application No. PCT/CN2020/083416, filed Apr. 6, 2020; which claims the benefit of U.S. Provisional Application Ser. No. 62/831,382, filed Apr. 9, 2019, which is hereby incorporated by reference in its entirety including any tables, figures, or drawings.

BACKGROUND OF THE INVENTION

According to a UN world water development report of 2017, more than 95% of wastewater in some least developed countries is released to the environment without treatment. Thus, it is desirable to develop an environment friendly water purification system that can be manufactured and operated at low costs and can run passively without power for individuals or households in remote areas.

BRIEF SUMMARY OF THE INVENTION

There continues to be a need in the art for improved designs and techniques for filter systems for water purification.

Embodiments of the subject invention pertain to a water filter system based on a nanostructured composite membrane for disinfecting microorganisms of water and removing impurities from the water.

According to an embodiment of the subject invention, a nanostructured composite membrane for purifying water can comprise a silver layer comprising a plurality of silver functionalized nanofibers for disinfecting microorganisms of water; and a chemical modified layer comprising a plurality of chemical modified nanofibers for removing impurities from the water. The plurality of silver functionalized nanofibers can comprise a plurality of polyvinyl alcohol (PVA) nanofibers coated with polydopamine (PDA) and silver, and each of the plurality of chemical modified nanofibers can comprise a polymer matrix and anionic polyelectrolytes for capturing metal ions of the water. The anionic polyelectrolytes are poly(sodium styrenesulfonate) (PSSNa) and the polymer matrix is polyvinyl alcohol (PVA). Moreover, each of the plurality of chemical modified nanofibers can comprise a plurality of surfaces coated with surface functional groups including sulfonate and hydroxyl for metal adsorption. The silver is formed as silver nanoparticles. The plurality of chemical modified nanofibers has an average fiber diameter in a range of 320-480 nm and a highly porous structure with random fiber orientations.

In another embodiment of the subject invention, a method for preparing a nanostructured composite membrane filter for purifying water is provided. The method can comprise preparing a silver layer comprising a plurality of silver functionalized nanofibers for disinfecting microorganisms of water; preparing a chemical modified layer comprising a plurality of chemical modified nanofibers for removing impurities from the water; and forming a composite membrane filter comprising the prepared silver layer and the prepared chemical modified layer. The preparing a silver layer can comprise forming a polyvinyl alcohol (PVA) nanofiberous membrane by electrospinning; and adding silver onto surfaces of the PVA nanofiberous membrane by first coating the nanofibers with polydopamine (PDA) and then soaking the PDA coated membrane in a silver nitrate solution. The preparing a chemical modified layer can comprise preparing a polyvinyl alcohol (PVA)/poly(sodium styrenesulfonate) (PSSNa) solution; electrospinning the PVA/PSSNa solution to produce a PVA/PSSNa nanofibrous membrane; and cross-linking the PVA/PSSNa nanofibrous membrane. The forming a composite membrane filter can comprise stacking the silver layer and the chemical modified layer to form the composite membrane filter. Moreover, the forming a composite membrane filter can comprise electrospinning a polyvinyl alcohol (PVA)/poly(sodium styrenesulfonate) (PSSNa) solution onto surfaces of the silver layer to form the composite membrane filter. The preparing a polyvinyl alcohol (PVA)/poly(sodium styrenesulfonate) (PSSNa) solution can comprise preparing a homogeneous solution of PVA and PSSNa in water at about 90° C.; and preparing a dope solution having about 10 wt % PVA with a predetermined mass ratio of PVA and PSSNa. The predetermined mass ratio of PVA and PSSNa is 5/1, 3/1, or 2/1. Furthermore, each of the plurality of chemical modified nanofibers can comprise a plurality of surfaces coated with surface functional groups including sulfonate and hydroxyl for metal adsorption. The plurality of chemical modified nanofibers has an average fiber diameter in a range of 320-480 nm and a porous structure with random fiber orientations. The plurality of silver functionalized nanofibers comprises a plurality of polyvinyl alcohol (PVA) nanofibers coated with polydopamine (PDA) and silver. The silver is formed as silver nanoparticles.

In some embodiment of the subject invention, a method for producing a water filter system is provided. The method can comprise preparing a nanostructured composite membrane filter for purifying water as described above; and packing the prepared nanostructured composite membrane filter based on a flat sheet packing scheme or a twisted corrugated packing scheme.

DETAILED DISCLOSURE OF THE INVENTION

Embodiments of the subject invention pertain to using a passive water purification system having a nanostructured composite membrane filter for water decontamination and disinfection.

A. Improved Membrane Structure

Adsorption is an effective and economic method for removal of impurities such as toxic heavy metal ions from water either by electrostatic interaction such as ionic interaction between positively charged metal ions and negatively charged sorbent materials or by chelation such as donation of the lone-pair electrons of the sorbent to metal ions to form coordinate bonds.

The key considerations for achieving high removal efficiencies include a large surface area and abundant adsorption sites. Electrospun polymeric nanofibrous membranes have fiber diameters typically in a range from nanometer to micrometer, resulting in high porosity and high surface areas for better adsorption. Surface functionalization can be additionally applied to introduce desirable functional group for enhanced heavy metal capture.

In one embodiment, instead of a conventional two-step membrane preparation involving spinning and post-functionalization, a novel single-step spinning strategy is utilized to simultaneously achieve high permeability and efficient metal capture.

Figure 1:
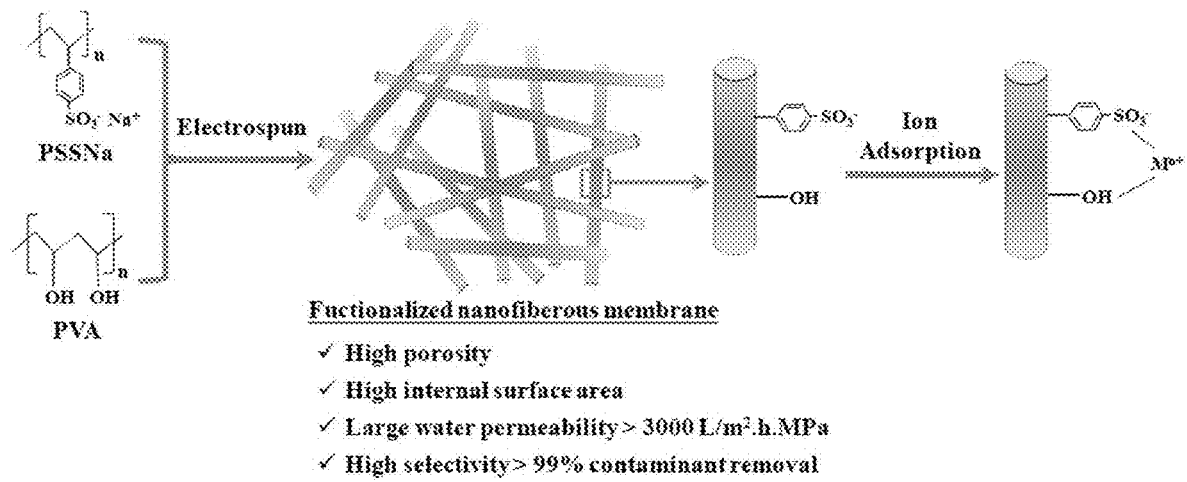
FIG. 1 is a schematic representation of a preparation process of a nanofibrous membrane for rapid contaminants removal, according to an embodiment of the subject invention.

As shown in FIG. 1, in certain embodiments, a nanofibrous membrane can comprise a plurality of poly(vinyl alcohol) (PVA)/poly(sodium styrenesulfonate) (PSSNa)

modified nanofibers for rapid contaminants removal. The poly(sodium styrenesulfonate) (PSSNa) is selected as an anionic polyelectrolyte for capturing metal ions due to the presence of sulfonate groups. The poly(vinyl alcohol) (PVA) is chosen as the polymer matrix due to its hydrophilic properties, thermal stability, compatibility with the PSSNa and ability to crosslink after chemical treatment.

In one embodiment, unlike conventional electrospinning that often involves organic solvents, water is utilized as the solvent to dissolve the PVA, making the membrane preparation method highly environment friendly and cost effective.

In one embodiment, the PVA solution is blended with the PSSNa solution to prepare a polymer dope for electrospinning. After a crosslinking treatment, the resulting membrane is formed with abundant surface functional groups such as sulfonate and hydroxyl for metal adsorption. The highly hydrophilic and porous nature of the membrane ensures a high permeability.

The performance of the nanofibrous membranes can be evaluated by determining the removal efficiency of some of the most frequently occurring impurities in water, including heavy metals such as lead (II), cadmium (II), nickel (II) and chromium (II).

Following are examples that illustrate procedures for practicing the invention. These examples should not be construed as limiting. All percentages are by weight and all solvent mixture proportions are by volume unless otherwise noted.

A1. Preparation of Nanofibrous Membranes

Figure 2A:
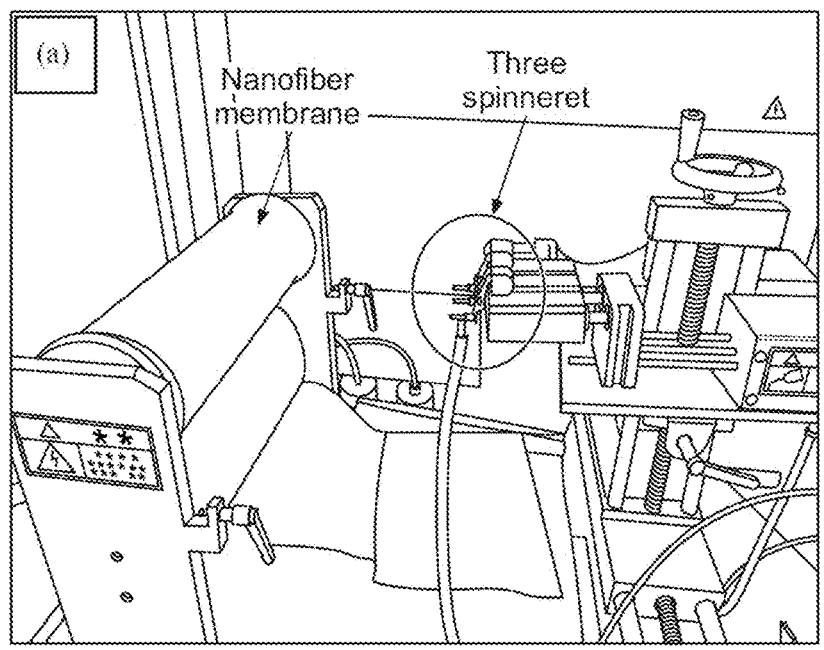
FIGS. 2A-2B show images of (a) a prototype of a spinneret and (b) a prototype of an electrospinning setup, according to an embodiment of the subject invention.
Figure 2B:
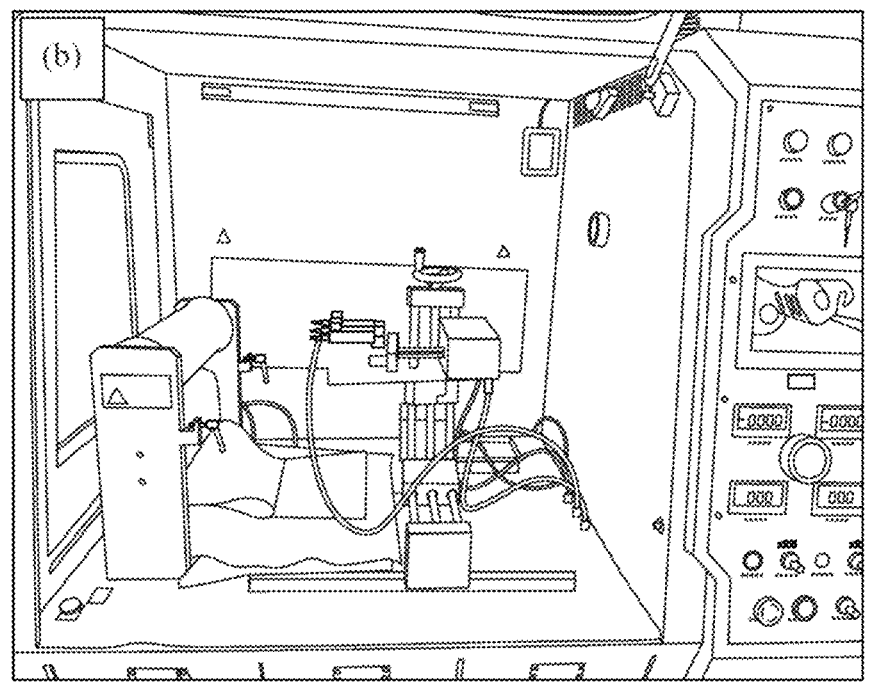

In one embodiment, nanofibrous membranes are prepared by an electrospinning setup as shown in FIGS. 2A-2B. Three spinnerets are used to reduce the spinning time and the nanofibers are electrospun onto the aluminum foil. The detailed spinning conditions such as polymer solution concentration, applied voltage, collection distance, and feed rate are shown in Table 1 below.

TABLE 1

Experimental Conditions for Electrospinning Process for Preparation of PVA/PSSNa Membrane

|   | Solvent | Polymer Conc. | PVA/PSSNa Mass ratio | Voltage (kV) | Feed rate (mm/min) | Collection distance (cm) |
|---|---|---|---|---|---|---|
| PVA | Water | 10 wt % | 5/1 | 20 | 0.025 | 15 |
| PVA | Water | 10 wt % | 3/1 | 20 | 0.025 | 15 |
| PVA | Water | 10 wt % | 2/1 | 20 | 0.025 | 15 |

Figure 3:
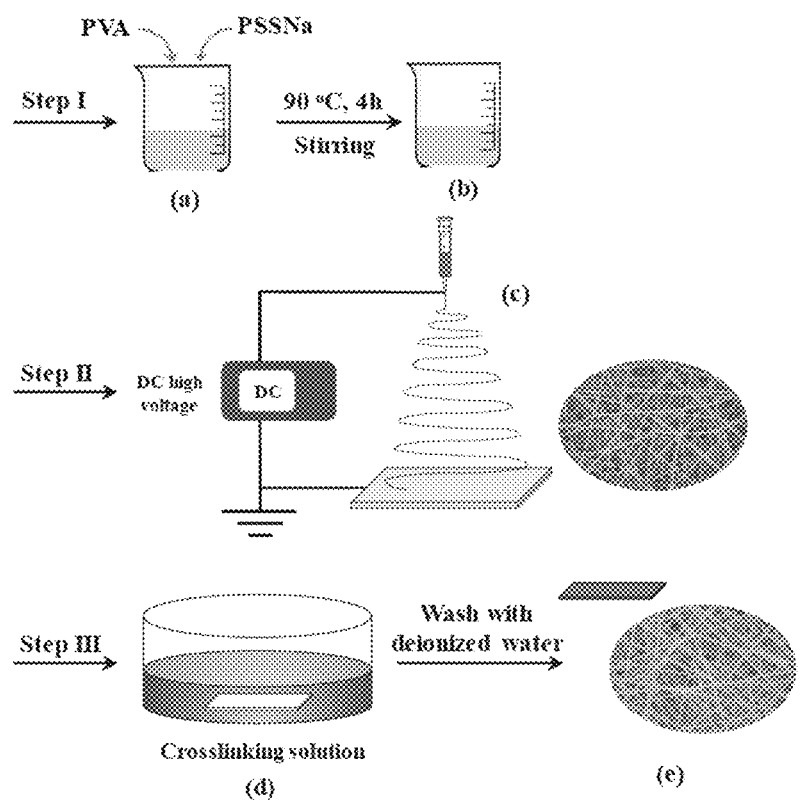
FIG. 3 is a schematic representation of specific steps of the preparation process of a nanofibrous membrane, according to an embodiment of the subject invention.

Referring to FIG. 3, a schematic representation of preparation process of the nanofibrous membrane is illustrated.

First, a homogeneous solution of PVA and PSSNa in water is prepared at about 90° C. Then, the dope solution contains about 10 wt % PVA with different mass ratios of PVA and PSSNa, including 5/1, 3/1, and 2/1, are prepared. The flow rate is set at about 0.025 mm/min and the high voltage applied is set at about 20 kV. The distance between the collector and the spinneret is set at about 15 cm as shown in Table 1.

In the electrospinning setup, a rotating metal drum having a diameter of, for example, about 30 cm and a rotating speed of, for example, about 100 rpm are selected to collect the deposited nanofibers. Moreover, a stepping motor is used to control the translational oscillatory motion perpendicular to the drum rotation direction to ensure the production of uniform electrospun scaffolds with a sufficient membrane area. Next, the electrospun nanofibrous membranes are immersed in about 4 wt % glutaraldehyde and about 0.2 wt % HCl acetic acid solution for about 0.5 hour to from a water-resistant network at conditions shown in Table 2 below. The membranes are then rinsed with deionized (DI) water to remove the residue solvents and stored in deionized water.

TABLE 2

Crosslinking Conditions

|   | Glutaraldehyde | Acetic acid | Hydrochloric acid | Duration |
|---|---|---|---|---|
| Content | 4 mL | 96 mL | 2 mL | 0.5 h |

Figure 4:
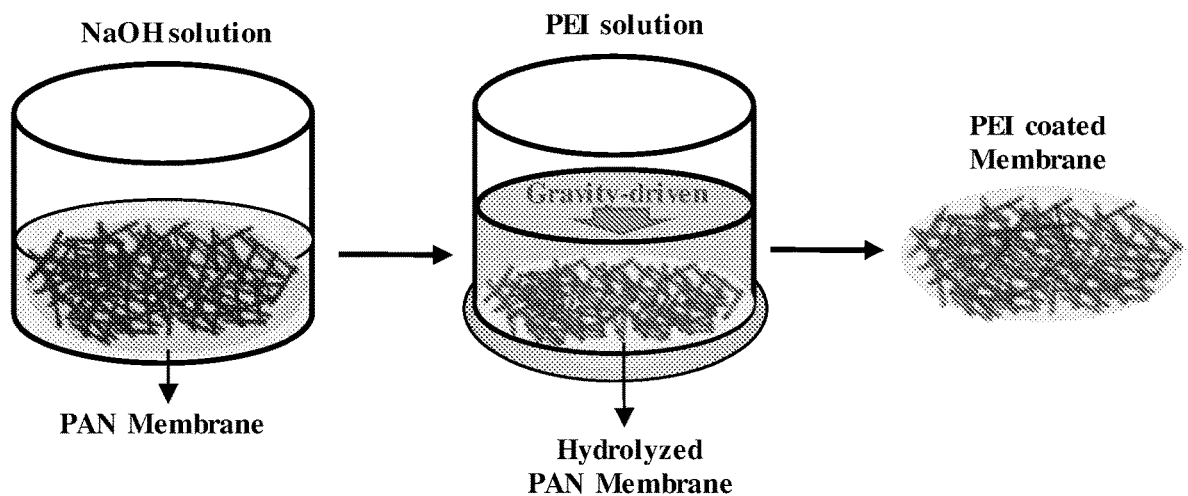
FIG. 4 is a schematic representation of a preparation process of a polyetherimide (PEI) coated polyacrylonitrile (PAN) nanofibrous membrane, according to an embodiment of the subject invention.

For comparison, a polyetherimide (PEI) coated polyacrylonitrile (PAN) nanofibrous membrane is also prepared and its performance is benchmarked against the performance of the PVA/PSSNa nanofibrous membrane of the embodiments of the subject invention. The electrospinning conditions used for preparing the PAN membrane are shown in Table 3 below. The PAN membrane is then modified using PEI coatings by performing following procedures which as illustrated in FIG. 4:

(1) A plurality of PAN nanofibrous membranes is hydrolyzed by soaking them into about 0.1 M NaOH solution at about 60° C. for about 1 hour, and the hydrolyzed PAN (hPAN) membranes are subsequently washed thoroughly using DI water.

(2) An aqueous mixture of about 0.1 wt % branched PEI and about 0.017 wt % glycerol diglyceryl ether is prepared and penetrated through membrane under gravitational force.

(3) The membrane is heat at about 70° C. for about 30 minutes to immobilize the PEI coating.

The resulting PEI coated membranes are named PEI-hPAN membranes hereinafter.

TABLE 3

Experimental Conditions for Electrospinning Process of PAN membrane

|   | Solvent | Polymer Conc. | Voltage (kV) | Feed rate (mm/min) | Collection distance (cm) |
|---|---|---|---|---|---|
| PEI-hPAN-1 | DMF | 8.0 wt % PAN | 20 | 0.085 | 15 |
| PEI-hPAN-2 | DMF | 4.0 wt % PAN | 20 | 0.085 | 15 |

Note: The recipe for PEI-hPAN-2 was developed in a previous project. Due to the relatively low water permeability of this membrane, a new recipe (PEI-hPAN-1) has been developed to improve the membrane permeability.

A2. Nanofibrous Membrane Characterization

The morphology of the electrospun sample is examined by scanning electron microscopy (SEM, Hitachi 54800, Japan). The Brunauer-Emmett-Teller (BET) surface area and pore size of nanofibers are measured using SA 3100 surface area analyzer (Beckman Coulter™, USA) and capillary flow porometry (Porolux 1000, Germany), respectively.

The porosity ($\varepsilon$) of the nanofibrous membranes is also determined by Equation (1) based on measurements of the dry mass ($W_{dry}$) and wet mass ($W_{wet}$) of the membrane samples.

$$\varepsilon = \frac{(W_{wet} - W_{dry})/\rho_w}{\left(\frac{W_{wet} - W_{dry}}{\rho_w}\right) - (W_{dry}/\rho_p)} \times 100\% \quad (1)$$

where $\rho_w$ and $\rho_p$ are density of wetting solvent ($\rho_w$=1.00 g/mL for deionized water) and that of the polymer ($\rho_p$=1.19 g/mL), respectively.

Figure 5A:
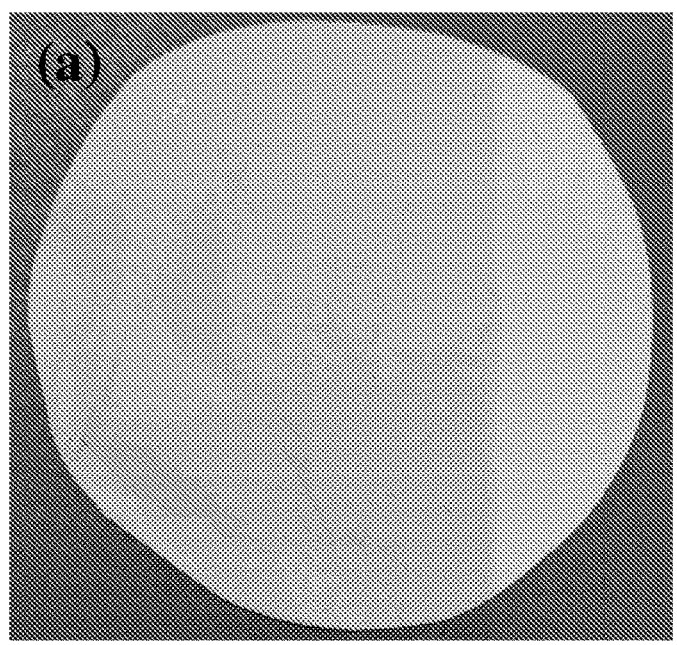
FIG. 5A shows an image of a prototype of a PVA/PSSNa nanofibrous membrane before crosslinking, according to an embodiment of the subject invention.
Figure 5B:
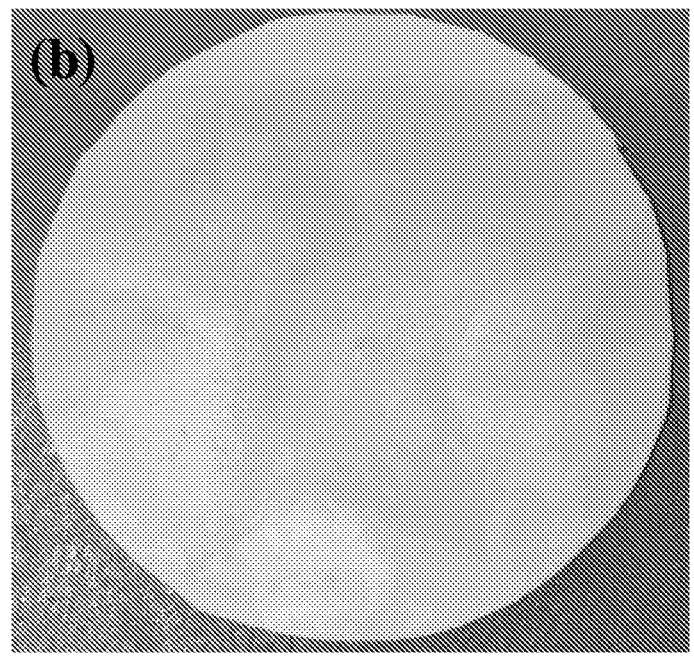
FIG. 5B shows an image of a prototype of a PVA/PSSNa nanofibrous membrane after crosslinking, according to an embodiment of the subject invention.
Figure 6A:
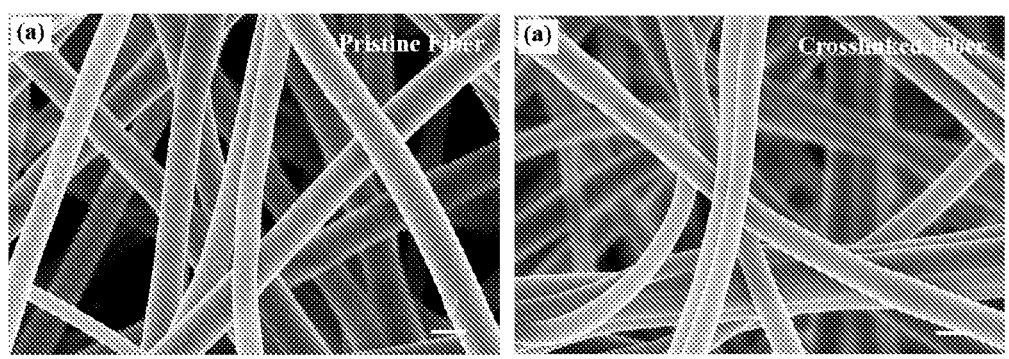
FIG. 6A shows SEM images (scale bar: 500 nm) of PVA/PSSNa nanofibers prepared by electrospun using a dope solution having a mass ratio of PVA/PSSNa of 2/1 before crosslinking (left) and after crosslinking (right), according to an embodiment of the subject invention.
Figure 6B:
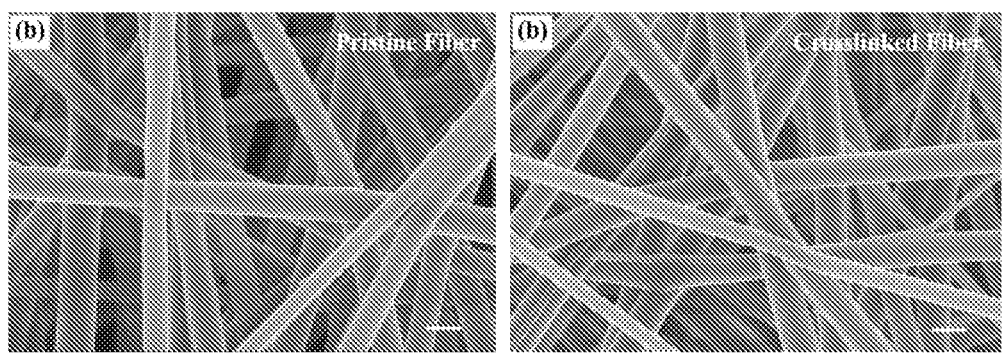
FIG. 6B shows SEM images (scale bar: 500 nm) of PVA/PSSNa nanofibers prepared by electrospun using a dope solution having a mass ratio of PVA/PSSNa of 3/1 before crosslinking (left) and after crosslinking (right), according to an embodiment of the subject invention.
Figure 6C:
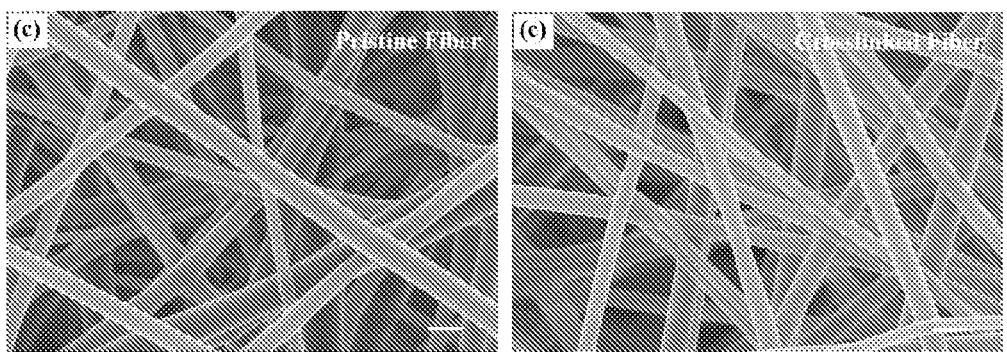
FIG. 6C shows SEM images (scale bar: 500 nm) of PVA/PSSNa nanofibers prepared by electrospun using a dope solution having a mass ratio of PVA/PSSNa of 5/1 before crosslinking (left) and after crosslinking (right), according to an embodiment of the subject invention.

Referring to FIGS. 5A-5B, the digital images of the nanofibrous membrane prepared show that the nofibrous membranes are uniform and smooth, suggesting that the crosslinking process has no effect on the morphology of nanofibrous membrane. The observation is confirmed by the SEM images of the nanofibrous membrane prepared shown in FIGS. 6A-6C.

The nanofibers are measured to have an average fiber diameter in a range of 320-480 nm and the PVA/PSSNa nanofibrous membranes demonstrate a highly porous structure with random fiber orientations. The physical properties of the obtained electrospun nanofibrous membranes are presented in Table 4 below. The nanofibrous membranes obtained with different mass ratios of PVA/PSSNa has similar porosity that may be as high as 90%. The BET surface area of the nanofibrous membranes is greater than 7.4 m²/g, providing large areas for adsorption. Nevertheless, the mean pore size of nanofibrous membrane with mass ratio of PVA/PSSNa of 2/1 and the mean pore size of 1250 nm is higher than that with mass ratio of PVA/PSSNa of 3/1 and the mean pore size of 790 nm and that with mass ratio of PVA/PSSNa of 5/1 and mean pore size of 860 nm. It is determined that the high porosity and large pore size significantly reduce the filtration resistance of the membrane.

TABLE 4

Properties of Electrospun PVA/PSSNa Nanofibrous Membranes

|   | Porosity (%) | BET surface area (m²/g) | Mean pore size (nm) |
|---|---|---|---|
| PVA/PSSNa 2/1 | 90.6 | 7.4 | 1250 |
| PVA/PSSNa 3/1 | 89.3 | 8.6 | 790 |
| PVA/PSSNa 5/1 | 88.6 | 8.1 | 860 |

A3. Membrane Filtration Performance

Figure 7:
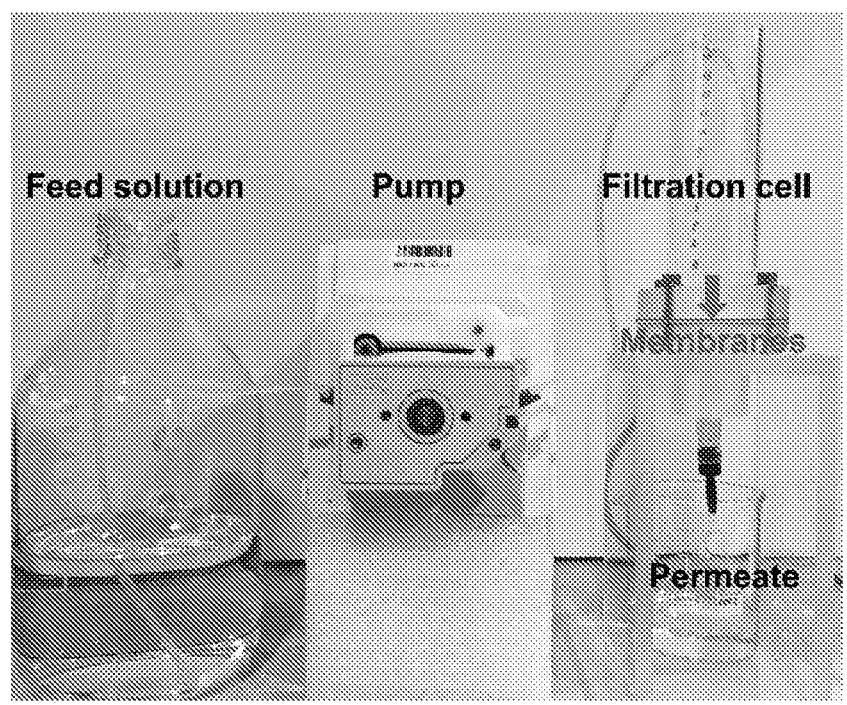
FIG. 7 shows a filtration setup for membrane separation performance tests of water flux and heavy metals removal, according to an embodiment of the subject invention.
Figure 8A:
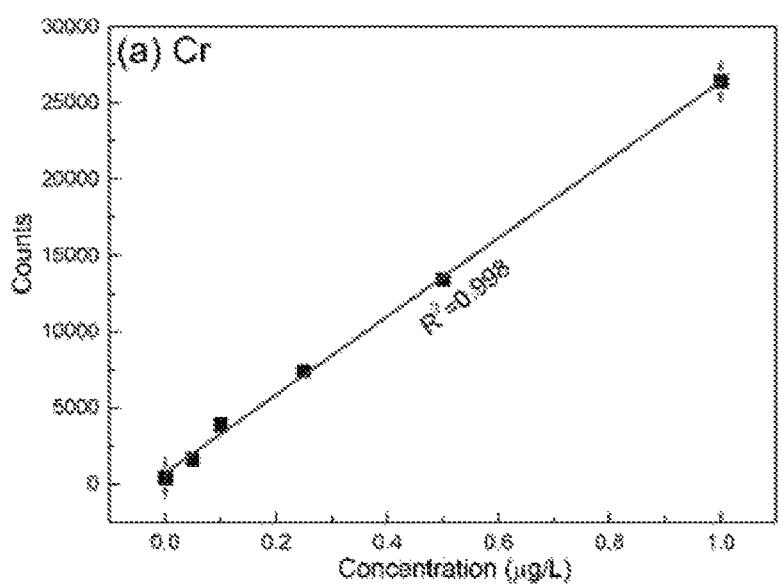
FIGS. 8A-8D are plot diagrams of standard curves of Cr, Ni, Cd, and Pb with a dynamic range of 0.05-1 μg/L in inductively coupled plasma mass spectrometry (ICP-MS) detection, respectively, according to an embodiment of the subject invention.
Figure 8B:
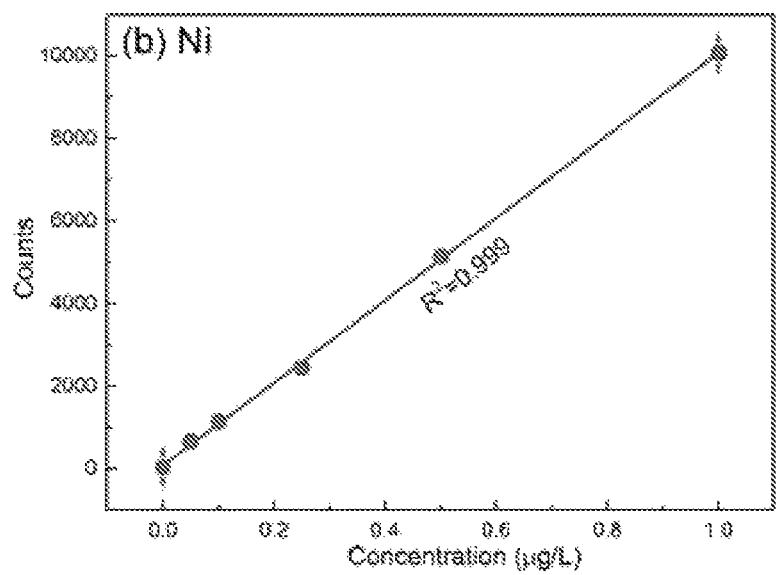
Figure 8C:
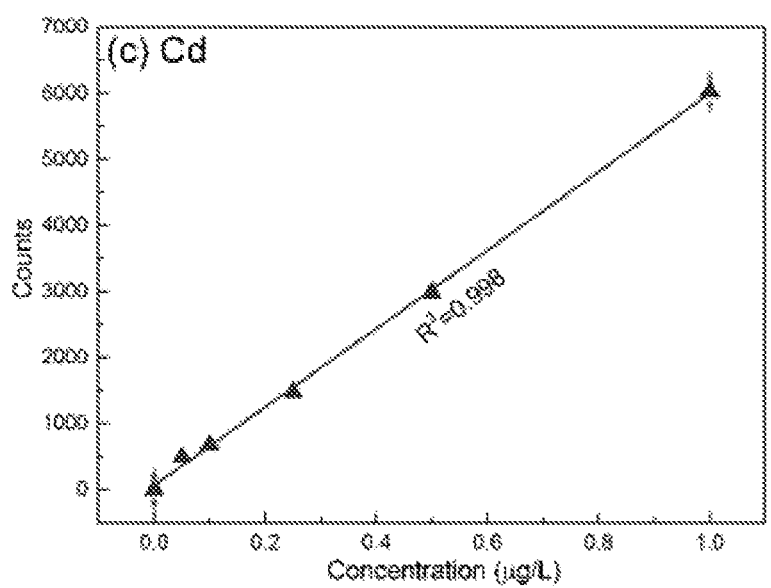
Figure 8D:
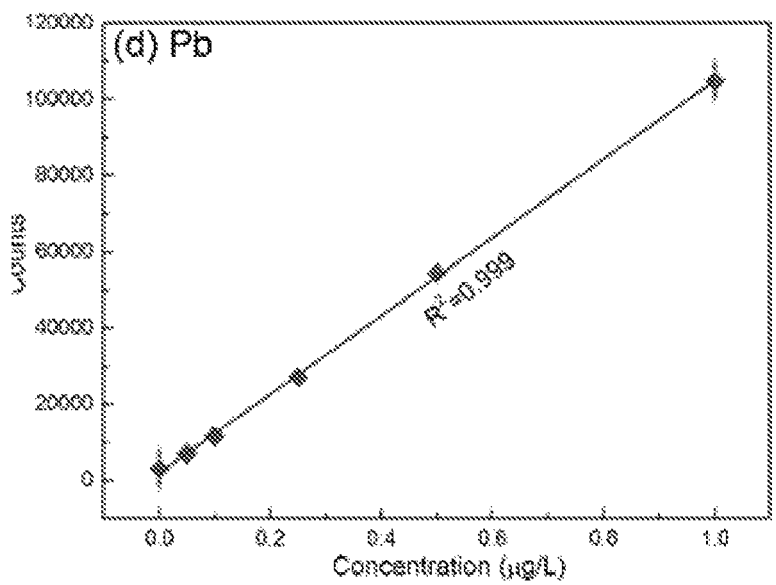

Referring to FIG. 7, the prepared PVA/PSSNa nanofibrous membranes including PVA/PSSNa mass ratio of 2/1, 3/1, or 5/1 and PEI-hPAN membranes are tested using a lab-scale gravity-driven filtration cell. Membranes are packed and fixed in the cell first, and a micro-peristaltic pump is used to pump a feed solution into the cell. The pump rate is adjusted to match the water flux to maintain a stable water height. Three water heights of 2.5 cm, 5.0 cm, and 10.0 cm are used to create corresponding pressured of 0.245 kPa, 0.490 kPa, and 0.980 kPa, respectively.

A4. Filtration Experiments

In one embodiment, an experiment for testing water permeability and heavy metals removal is conducted using a 2.5 cm water height (=0.245 kPa) for the three membranes with different PVA/PSSNa ratio, namely, 2/1, 3/1, and 5/1, and the PEI-hPAN membranes.

In the experiment, a membrane is first cut into a disk coupon that fits the filtration cell and having an effective filtration area of about 14.5 cm² and stored in deionized (DI) water for further test. Chromium (Cr), nickel (Ni), cadmium (Cd), and lead (Pb) are used as the heavy metals. A stock solution containing 500 mg/L of each metal is prepared by dissolving $CrCl_3 \cdot 6H_2O$ (Dieckmann), $Ni(NO_3)_2 \cdot 6H_2O$ (Dieckmann), $Cd(NO_3)_2 \cdot 4H_2O$ (Aladdin), and $Pb(NO_3)_2$ (Uni-Chem) in aqueous solution such as Milli-Q ultrapure water, respectively. Two membrane coupons are packed into the cell for the test. First, about 500 mL of Milli-Q ultrapure water is delivered to the cell to rinse the membrane. Subsequently, a solution having either a single metal or mixed metals of a concentration of, for example, 50 µg/L, is used to test membrane separation performance. Samples are collected from the permeate with specific time intervals. The water flux permeability is calculated using following equations:

$$J_w = \frac{10 \cdot \Delta m/\rho}{Ar \cdot t} \quad (2)$$

$$A = \frac{J_w}{\Delta P} \quad (3)$$

where $J_w$ is water flux (L/m²/h), $\Delta m$ is the collected mass of permeate (g), $\rho$ is water density (i.e., 1 g/cm³), Ar is the effective filtration area (i.e., 14.5 cm²), t is the collection time (h), A is water permeability, and $\Delta P$ is the applied pressure (MPa).

The heavy metals are detected by an inductively coupled plasma mass spectrometry (ICP-MS, Agilent 7900) and the removal efficiency of the heavy metal is calculated by following equation:

$$R = \left(1 - \frac{C_p}{C_f}\right) \times 100\% \quad (4)$$

where R is the removal efficiency, and $C_p$ and $C_f$ are the heavy metal concentration of permeate and feed solution (µg/L), respectively.

In FIGS. 8A-8D, standard curves of each metal with a dynamic range from 0.05 to 1.0 µg/L for heavy metals quantification on ICP-MS are shown. All the metals with the lowest calibration concentration of about 0.05 g/L are detectable using the instrument. The linearity of the tested dynamic range, namely, the lowest calibration concentration of each compound to the highest concentration, also shows good fits of linearity over 0.99 for all metals. A result of at least 99.9% removal efficiency for an initial heavy metal concentration of about 50 g/L demonstrates that high instrumental sensitivity and high linearity of the analytical method ensure accuracy of the detection.

A5. Membrane Water Permeability

Figure 9:
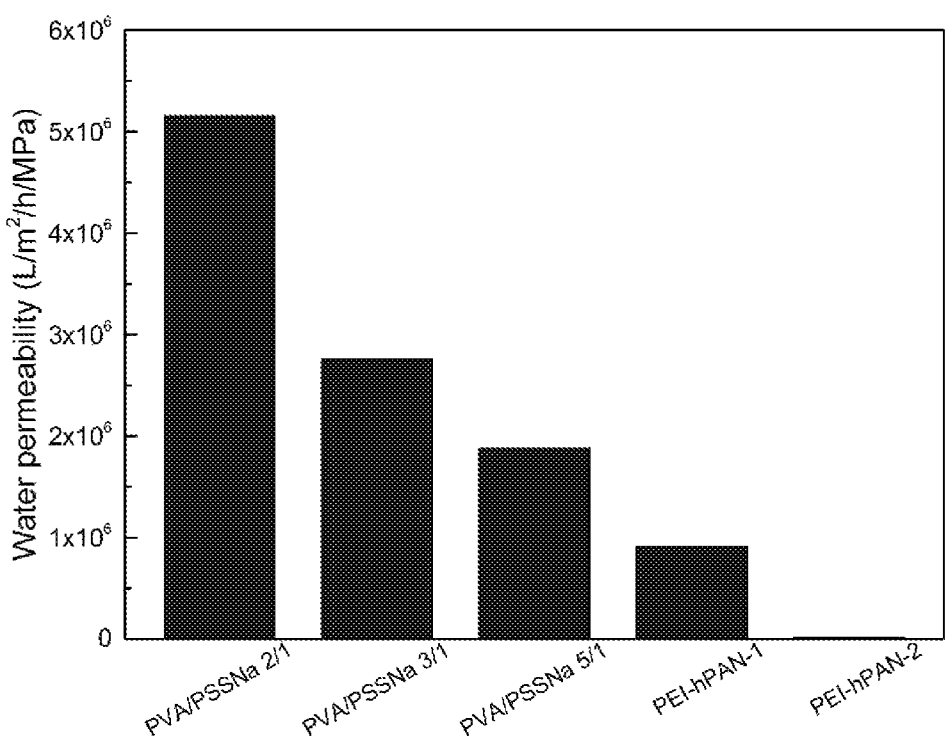
FIG. 9 is a plot diagram of results of water permeability tests of membranes with PVA/PSSNa mass ratios of 2/1, 3/1, and 5/1, and of PEI-hPAN membranes, according to an embodiment of the subject invention.
Figure 10A:
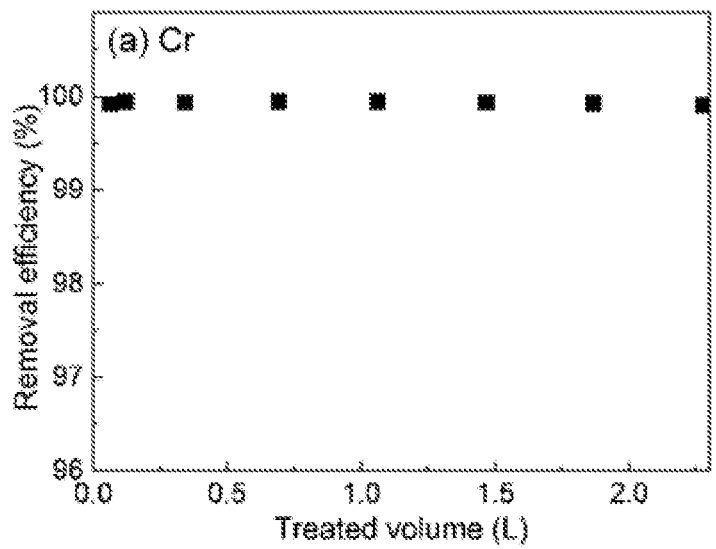
FIGS. 10A-10D are plot diagrams showing the removal efficiency of (a) Cr, (b) Ni, (c) Cd, and (d) Pb at different treated volume, at experimental conditions: initial heavy metal concentration of 50 μg/L, 2 stacked PVA/PSSNa 3/1 membrane coupons, water head 2.5 cm, and 25° C., according to an embodiment of the subject invention.
Figure 10B:
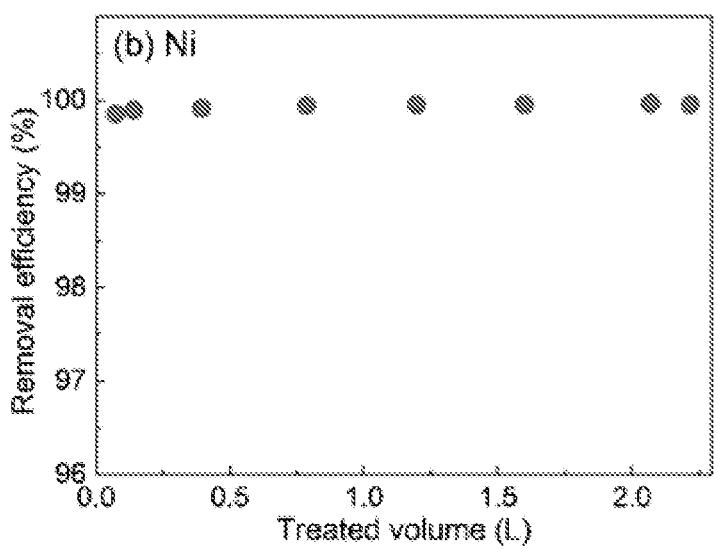
Figure 10C:
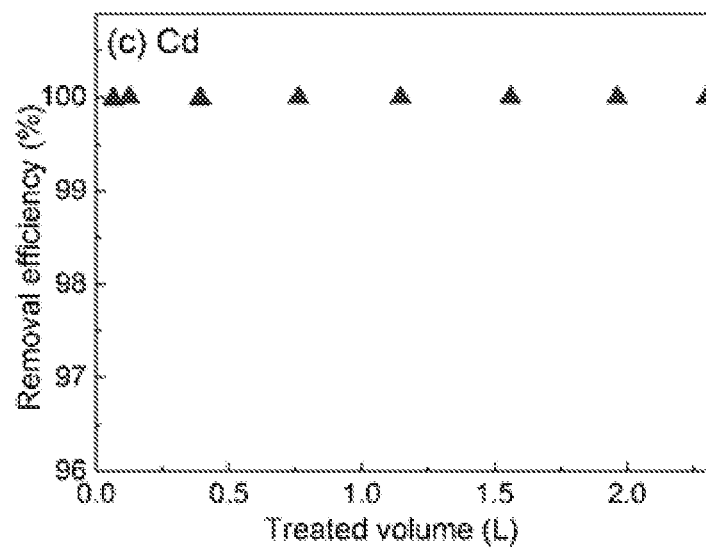
Figure 10D:
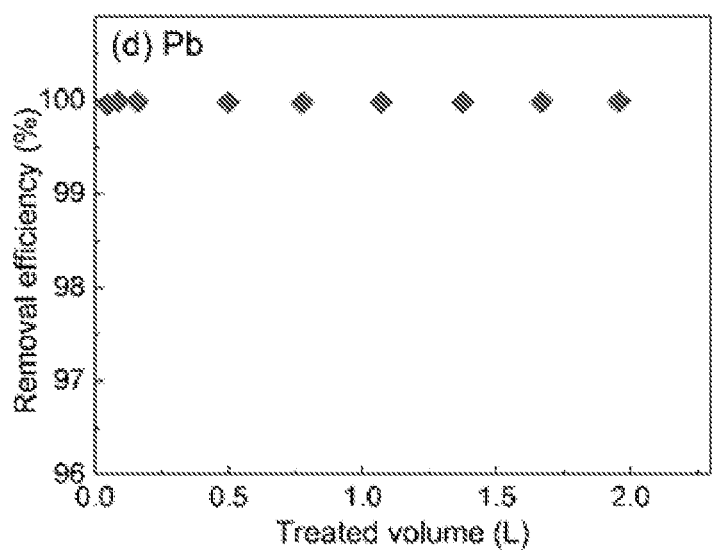
Figure 11A:
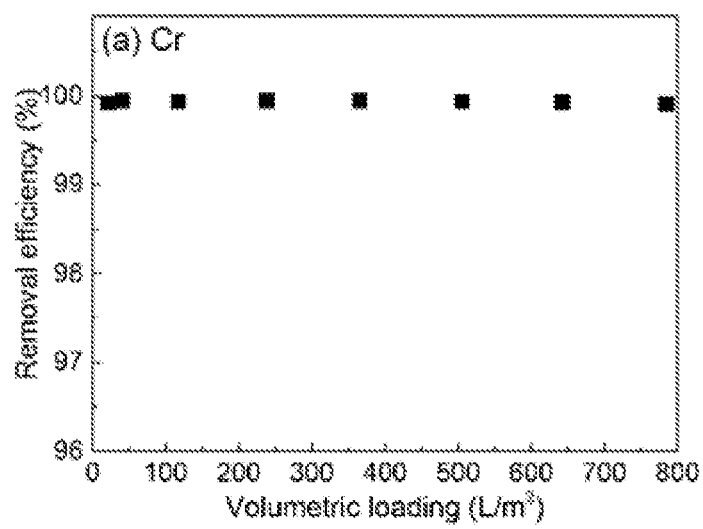
FIGS. 11A-11D are plot diagrams showing removal efficiencies of Cr, Ni, Cd, and Pb at different volumetric loading, according to an embodiment of the subject invention.
Figure 11B:
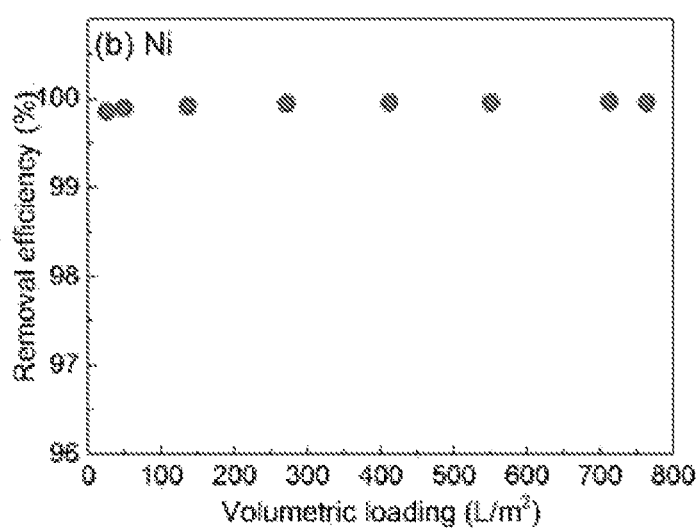
Figure 11C:
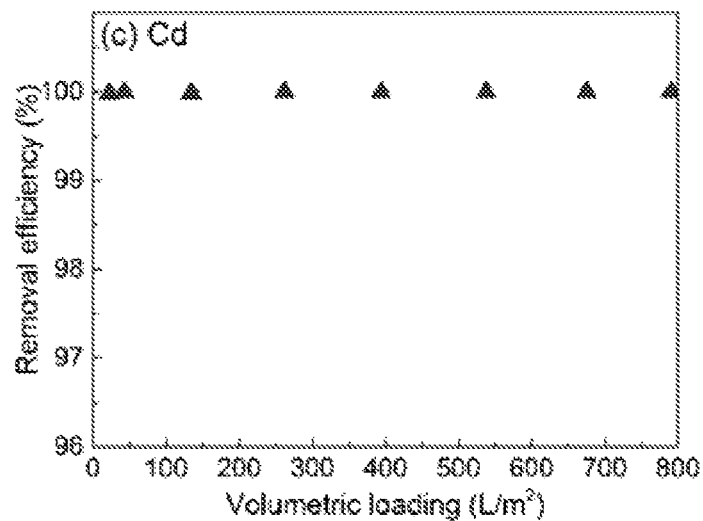
Figure 11D:
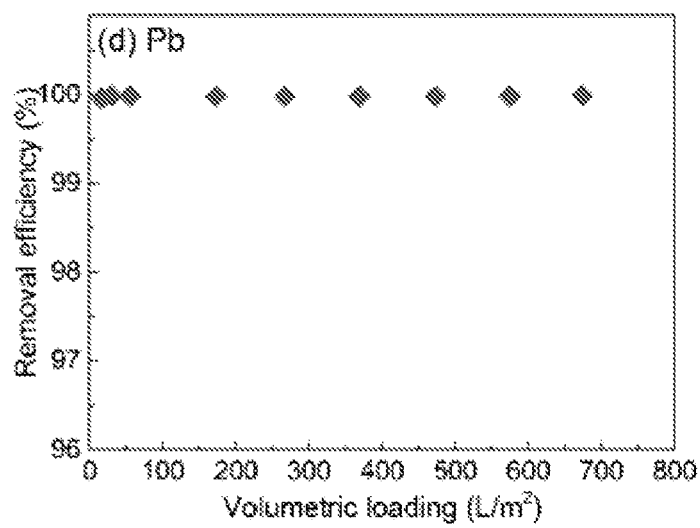

FIG. 9 presents the results of water permeability tests of the membranes prepared with three PVA/PSSNa ratios of 2/1, 3/1, and 5/1, and the PEI-hPAN membranes. All the PVA/PSSNa membranes show extremely high water permeability that is on the order of several 10⁶ L/m²/h/MPa) with a water height of 2.5 cm corresponding to an applied pressure of 0.245 KPa.

The water permeability results are approximately 3 orders of magnitude higher than the targeted value of about 3000 L/m²/h/MPa, greatly enhancing the throughput of the membrane. To achieve the targeted throughput of treating 0.25-0.5 L within 1-2 minutes, it is possible to reduce the membrane areas to a few tens of cm². The difference in permeability between the PVA/PSSNa membranes can be attributed to the membrane thickness and of different PVA/PSSNa mass ratios. Due to the high PSSNa content at PVA/PSSNa of a mass ratio of 2/1, the polymer solution is denser than these of the PVA/PSSNa of mass ratios of 3/1 and 5/1, resulting in a lower syringe injection speed during electrospinning process and thus thinner (less mass) membrane within same preparation time. The reduction of membrane thickness, together with higher porosity and pore size, results in smaller resistance and thus higher water permeability.

Generally, the PEI-hPAN membranes show much lower permeability compared to PVA/PSSNa membranes. With an improved recipe to optimize the membrane pore structure and PEI coating, the permeability of the PEI-hPAN-1 membrane is greatly enhanced.

Nevertheless, the permeability of PEI-hPAN-1 is still less than 20% of that of PVA/PSSNa with a mass ratio of 2/1. A key disadvantage of using the PEI coating is that the highly viscous PEI polymer solution has a strong tendency of blocking the membrane pores. Considering the inferior permeability performance of the PEI-hPAN membranes, the use of the PVA/PSSNa approach is preferred. Another advantage provided by the PVA/PSSNa membranes is that water can be used as the solvent, which is more economical and environmentally benign.

A6. Membrane Removal Efficiency of a Single Heavy Metal

Referring to FIGS. 10A-10D, the removal efficiency of each heavy metal by PVA/PSSNa membrane with a mass ratio of 3/1 as a function of treated water volume is shown. The water height applied is set at about 2.5 cm and the solution has only a single type of metal with an initial concentration of about 50 µg/L. It is observed that the membrane achieves approximately 100% removal efficiency for all types of metal. This remarkable removal efficiency suggests that the PVA/PSSNa membrane has great capability to capture heavy metals from water.

FIGS. 11A-11D present the removal efficiency of each heavy metal by PVA/PSSNa membrane with a mass ratio of 3/1 at different volumetric loading. The membrane maintains removal efficiencies of four heavy metals that are close to 100% with the volumetric loading up to about 800 L/m². The high removal efficiencies of the membrane at large volumetric loading demonstrate the huge potential of the PVA/PSSNa membranes for treating large volume of unpurified water containing heavy metals with superior retention of toxic heavy metals.

A7. Membrane Removal Efficiency of Heavy Metals in a Mixed Solution

Figure 12A:
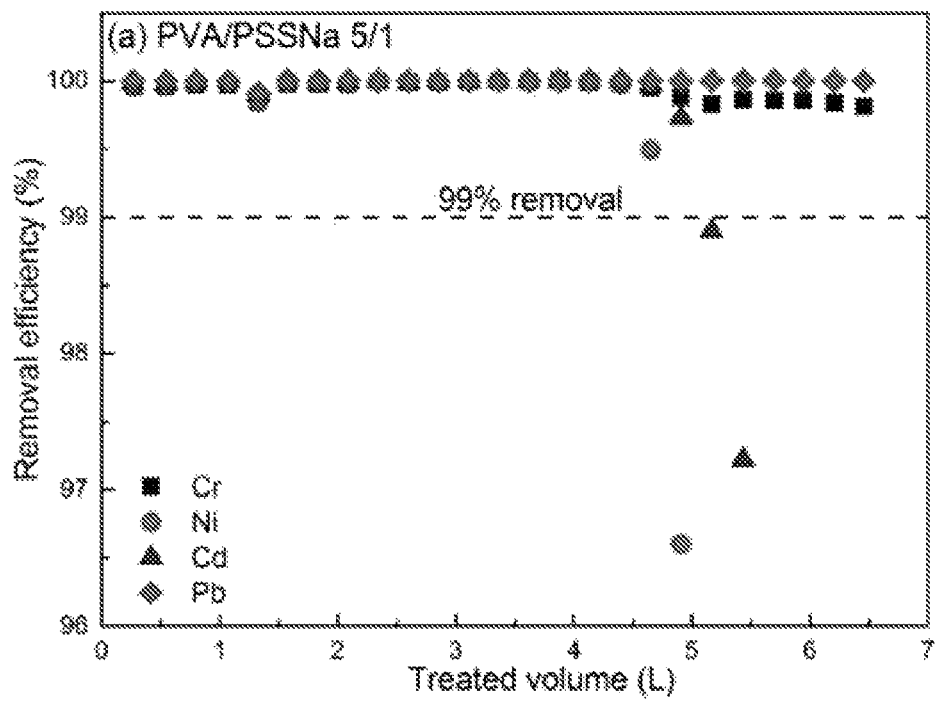
FIGS. 12A-12C are plot diagrams showing removal efficiencies of Cr, Ni, Cd, and Pb for PVA/PSSNa membrane with mass ratios of (a) 5/1, (b) 3/1, and (c) 2/1 at different treated volume, at experimental conditions: initial concentration of 50 μg/L for each heavy metal, 2 stacked PVA/PSSNa membrane coupons, water head 2.5 cm, and 25° C., according to an embodiment of the subject invention.
Figure 12B:
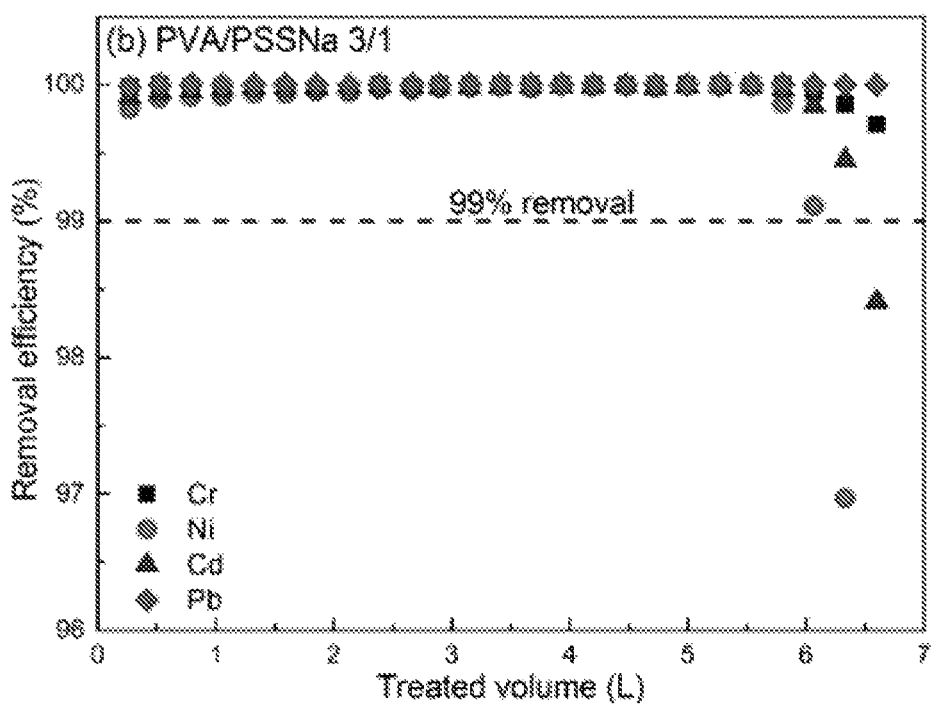
Figure 12C:
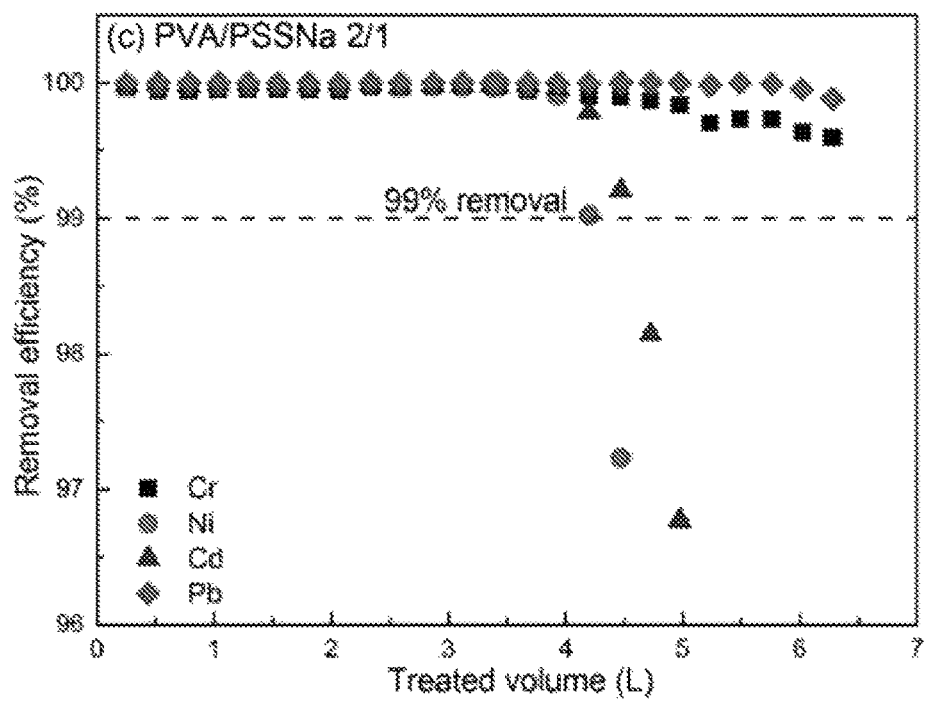

In FIGS. 12A-12C, the removal efficiencies for a solution containing a cocktail of four heavy metals (Cr, Ni, Cd, and Pb) by membranes with PVA/PSSNa with mass ratios of 5/1, 3/1, and 2/1, are shown. The targeted removal efficiency is 99% which is marked by the dash line in FIGS. 12A-12C. All the membranes show high removal efficiencies greater than 99% for Cr and Pb for treated volume up to about 6 L.

Since the amount of membrane area used in this test is only 14.5 cm², much greater amount of water can be treated if a twisted corrugated packing scheme as discussed below is employed. The removal efficiencies of Ni and Cd decline with treated volumes. After a volume of about 4-5 L of water is filtered, the removal efficiency drops to values lower than 99%. Among the three membranes, it is noted that the PVA/PSSNa membrane with a mass ratio of 3/1 is most effective for the metal removal. The result may be explained by the competing effects of (1) increased membrane mass, and (2) decreased relative content of PSSNa with higher PVA/PSSNa mass ratios.

Figure 13A:
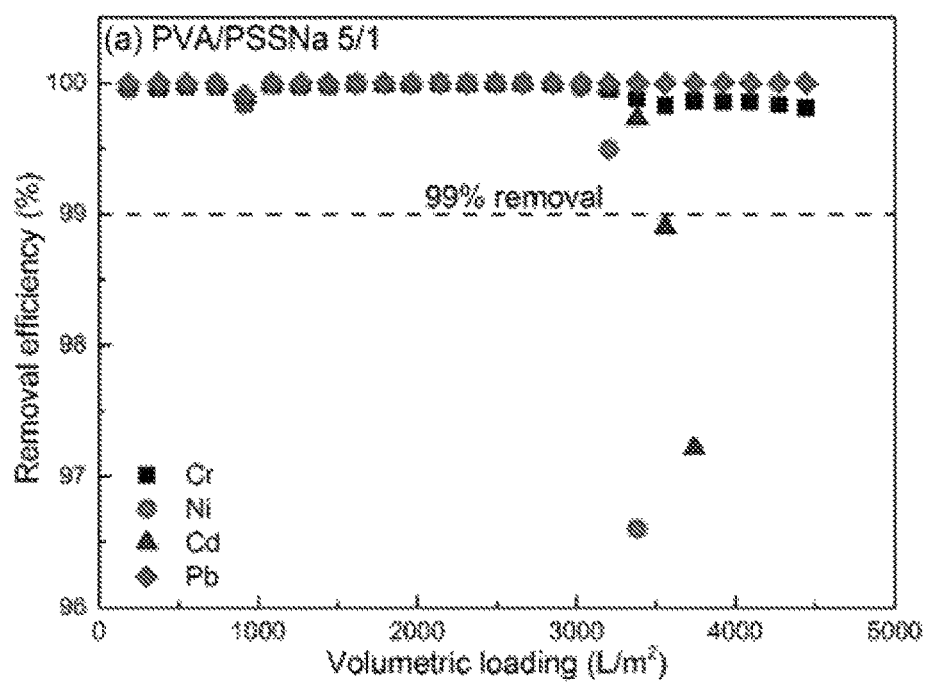
FIGS. 13A-13C are plot diagrams showing removal efficiencies of Cr, Ni, Cd, and Pb for PVA/PSSNa membrane with mass ratios of (a) 5/1, (b) 3/1, and (c) 2/1 at different volumetric loading, at experimental conditions: initial concentration of 50 μg/L for each heavy metal, 2 stacked PVA/PSSNa membrane coupons, water head 2.5 cm, and 25° C., according to an embodiment of the subject invention.
Figure 13B:
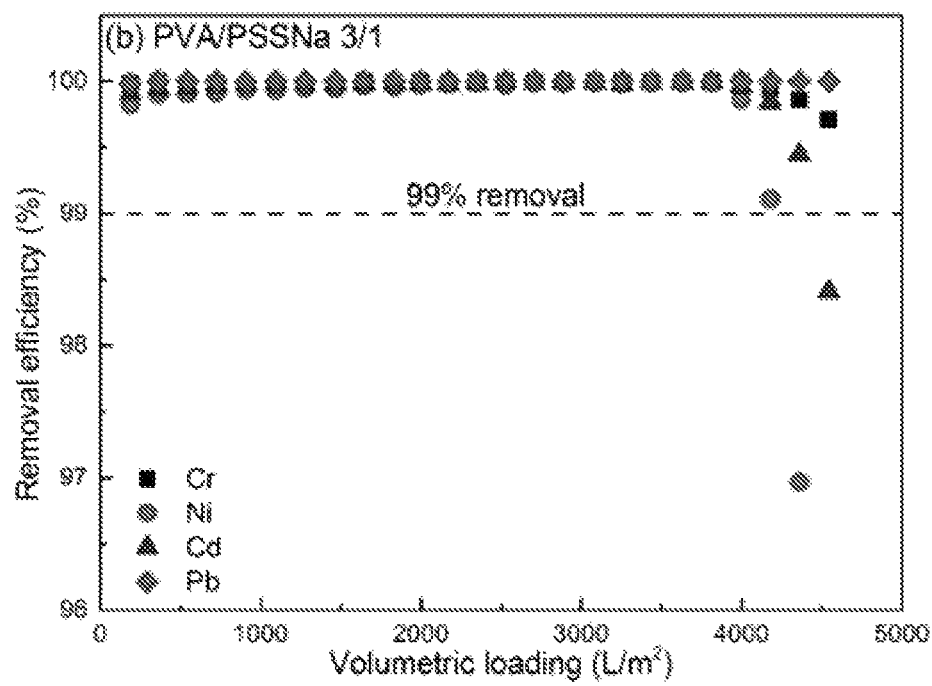
Figure 13C:
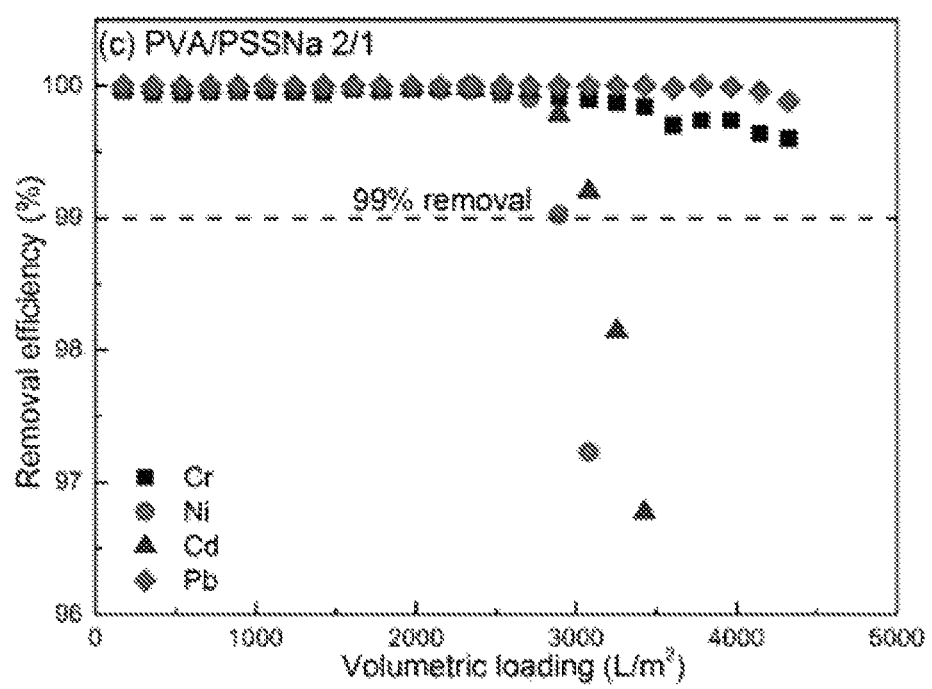

Referring to FIGS. 13A-13C, the removal efficiencies of the four heavy metals using membranes with PVA/PSSNa mass ratios of 5/1, 3/1, and 2/1 in a mixed heavy metals solution at different water volumetric loading are shown. For the best performed PVA/PSSNa 3/1 membrane, the volumetric loading can go up to about 4000 L/m² for a target removal efficiency of about 99%.

Figure 14:
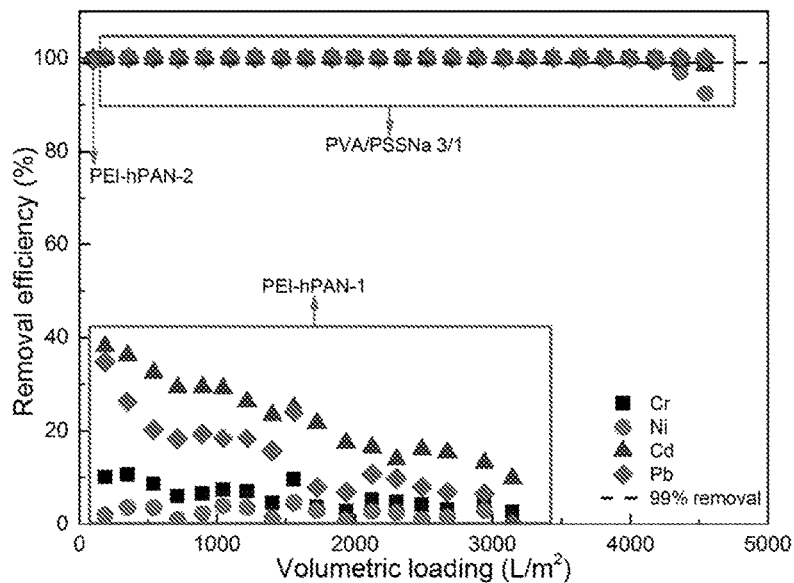
FIG. 14 is a plot diagram showing removal efficiencies of Cr, Ni, Cd, and Pb for a membrane with a PVA/PSSNa mass ratio of 3/1 and PEI-hPAN membranes at different volumetric loading, at experimental conditions: initial concentration of 50 μg/L for each heavy metal, 2 stacked membrane coupons, water head 2.5 cm, and 25° C., according to an embodiment of the subject invention.

In FIG. 14, the removal efficiencies of four heavy metals using PVA-PSSNa 3/1 membrane are compared with these of the PEI-hPAN membranes for a mixed heavy metal solution. It is observed that both the PVA/PSSNa 3/1 membrane and the PEI-hPAN-2 membrane have excellent removal efficiencies. Compared to PEI-hPAN-2, PEI-hPAN-1 has reduced loading of PEI in order to achieve higher membrane water permeability as shown in FIG. 9. However, the reduced PEI loading leads to significantly lower heavy metal removal efficiency.

The more efficient removal of the PVA/PSSNa membranes may be ascribed to the combined effects of electrostatic attraction between negatively charged membrane and positively charged metal ions as well as the complexing bonding between metal ions and membrane functional groups, for example, —OH and —$SO_3^-$.

In comparison, the PEI-hPAN membranes are positively charged, which may compromise the capture of heavy metals due to electrostatic repulsion. Based on the results, the PVA/PSSNa membranes are preferred for heavy metal removal thanks to their higher water permeability, more efficient removal, and greener preparation conditions.

A8. Composite Membrane Structure and its Disinfection Power

Figure 15:
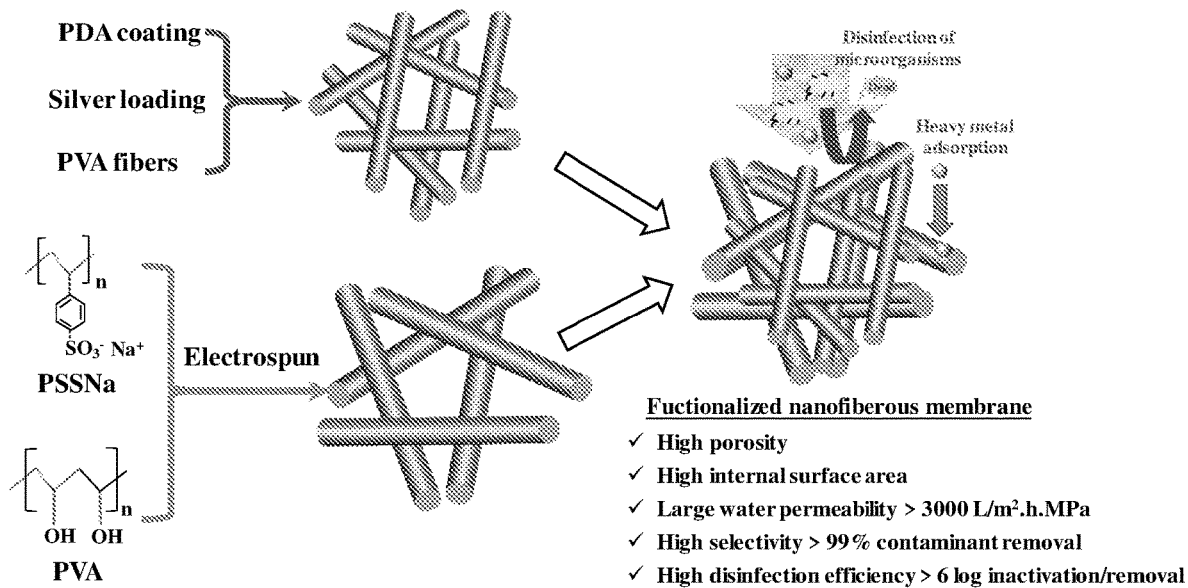
FIG. 15 is a schematic representation of a preparation process of a nanostructured composite membrane for water purification, according to an embodiment of the subject invention.
Figure 16:
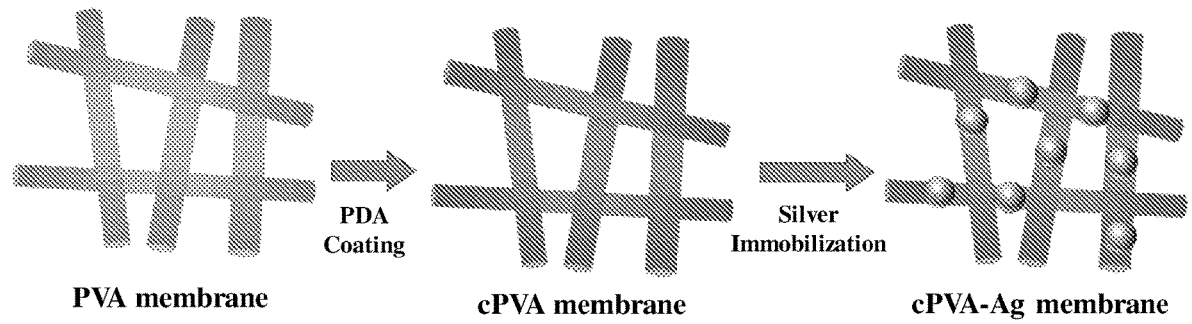
FIG. 16 is a schematic representation of a preparation process of a silver loaded cPVA-Ag nanofibrous membrane, according to an embodiment of the subject invention.

A combined high disinfection power (>6 log inactivation/removal) and efficient great heavy metals removal using a composite membrane structure can be achieved. The composite structure can comprise two layers including a top layer of silver-functionalized nanofibers such as sliver loaded PVA for disinfection and a bottom layer of PVA/PSSNa for heavy metal removal as shown in FIG. 15. To realize the silver loading onto a nanofibrous membrane, the following strategies are adopted. A PVA nanofibrous membrane is first coated with polydopamine (PDA) tris buffer solution (2.0 g/L, 10 mM tris, pH 8.5) for about 12 hours at about 25° C. and then soaked in a silver nitrate solution having a concentration of about 4.0 g/L for about 8 hours as shown in FIG. 16, resulting in spontaneously immobilizing silver nanoparticles due to the reducing groups such as catechol groups in the polydopamine.

Figure 17:
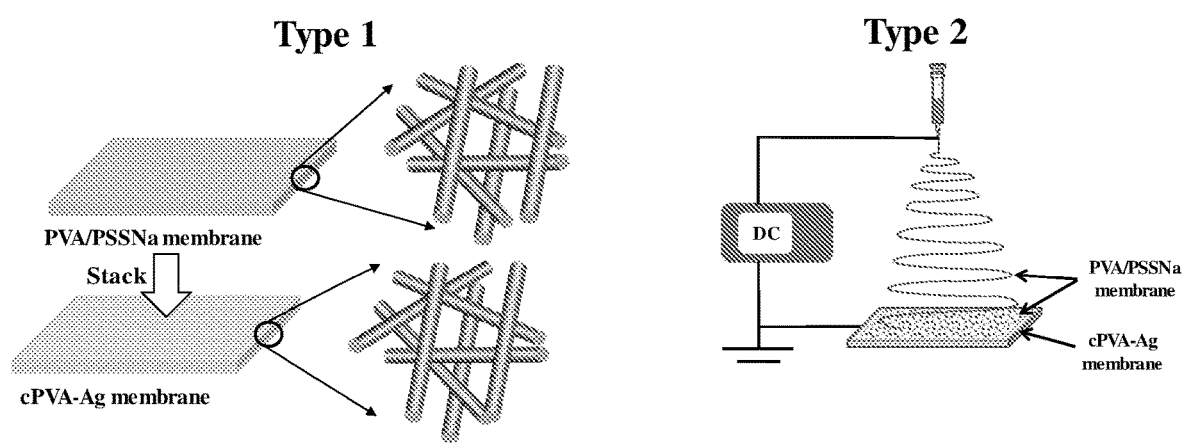
FIG. 17 shows two types of forming processes of a nanostructured composite membrane, according to an embodiment of the subject invention.

The overall composite membrane can be obtained via two different approaches as shown in FIG. 17. In the first approach, two different functional nanofibrous membranes, namely, the PVA/PSSNa membrane and the silver-loaded cPVA-Ag membrane, are separately prepared and then assembled by physical stacking or gluing. Alternatively, the silver-loaded cPVA-Ag membrane is prepared first, and then PVA/PSSNa is directly electrospinned onto the cPVA-Ag membrane. By combining the anti-microbial nature of cPVA-Ag layer and heavy metal removal of PVA-PSSNa layer, the composite membrane structure can achieve simultaneous microorganism retention/inactivation and heavy metals removal.

To avoid the potential effect of crosslinking PVA/PSSNa membrane to the cPVA-Ag membrane, the first type of assembling strategy is preferred for preparing the composite membrane for membrane disinfection.

Static diffusion inhibition zone tests and dynamic bacteria removal tests are conducted to investigate membrane disinfection performance.

For the diffusion inhibition zone tests, about 0.1 mL of *E. coli* culture is spread on a Luria-Bertani (LB) agar plate. A membrane coupon having a diameter of about 1.0 cm is placed on the LB agar plate and is incubated in an oven at about 37° C. for about 24 hours. The membrane coupon is then taken out to observe the growth of bacteria.

Figure 18A:
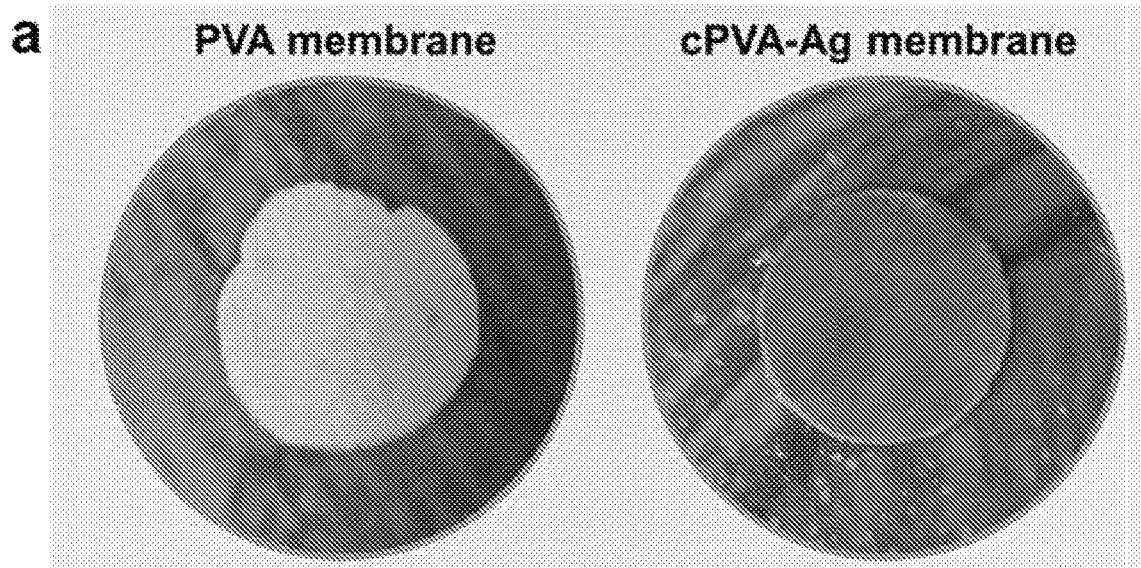
FIG. 18A shows images of results of static diffusion inhibition zone test for original PVA membrane and cPVA-Ag membrane.
Figure 18B:
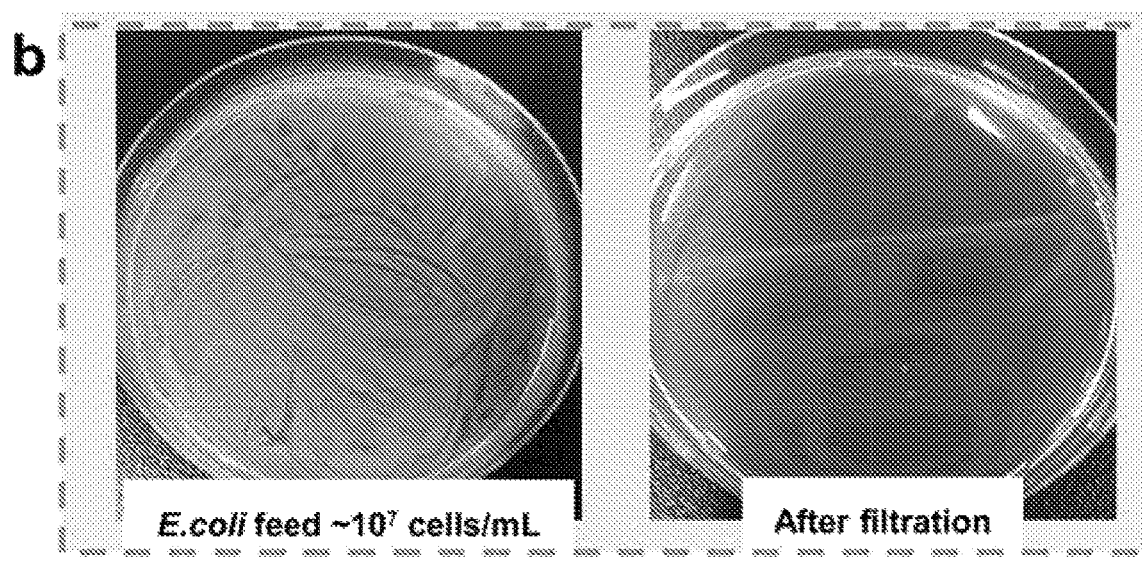
FIG. 18B shows images of colonies formed by E. coli in feed water and permeate after filtration by cPVA-Ag membrane, according to an embodiment of the subject invention.

The silver coated cPVA-Ag membrane shows a clean surface without growth of bacteria after 24 hours of incubation as shown in FIG. 18A. In comparison, the uncoated PVA membrane generates a fuzzy surface that can be attributed to the growth of bacteria as shown in FIG. 18A. The result clearly demonstrates the superior disinfection ability of cPVA-Ag membrane. Furthermore, a feed bacteria solution having a concentration of about $10^7$ cells/mL is filtered by the cPVA-Ag membrane under a gravity-driven condition. No bacteria is detected in the permeate side as shown in FIG. 18B, indicating high disinfection power by the cPVA-Ag membrane. Considering the detection limit of about 10 cells/mL, the cPVA-Ag membrane achieves at least a reduction of the bacteria greater than 6 log. In addition, the results show that the leaching concentration of silver in the permeate is below about 10 µg/L, which is recognized as a safe concentration according to the World Health Organization (WHO) standard (100 µg/L) for drinking water.

B. Design and Analysis of Membrane Packing Schemes

Membrane packing plays a critical role in determining the membrane throughput. Generally, the membrane area (5) required for achieving a given filtration rate F can be calculated by Equation (5):

$$S = \frac{F}{P \cdot A} \quad (5)$$

where A is the membrane permeability, and P is the applied pressure.

Various membrane packing schemes including a flat sheet packing scheme, a twisted corrugated packing scheme and a spiral wound packing scheme may be used for fabricating the nanostructured composite membrane filter.

In the following exemplary experiments, a targeted filtration rate is predetermined to be in a range of 0.25-0.5 L/min. A maximum applied pressure of 20 kPa is set to allow pump-free filtration, for example, gravity-driven or vacuum-driven filtration. To achieve the targeted filtration rate, a membrane area of approximately 0.25 $m^2$ is applied, assuming that the permeability of the prepared nanofibrous membrane is around 3000 $L/m^2/h/MPa$. It is noted that high membrane permeability can decrease the required membrane area in an inversely proportional manner.

The high-throughput filter products for possible tap water filtration or for easy-to-carry compact water filter bottles are considered for development of filter regeneration method. The details of the packing schemes are presented below.

B1. Flat Sheet Packing Scheme

Figure 19:
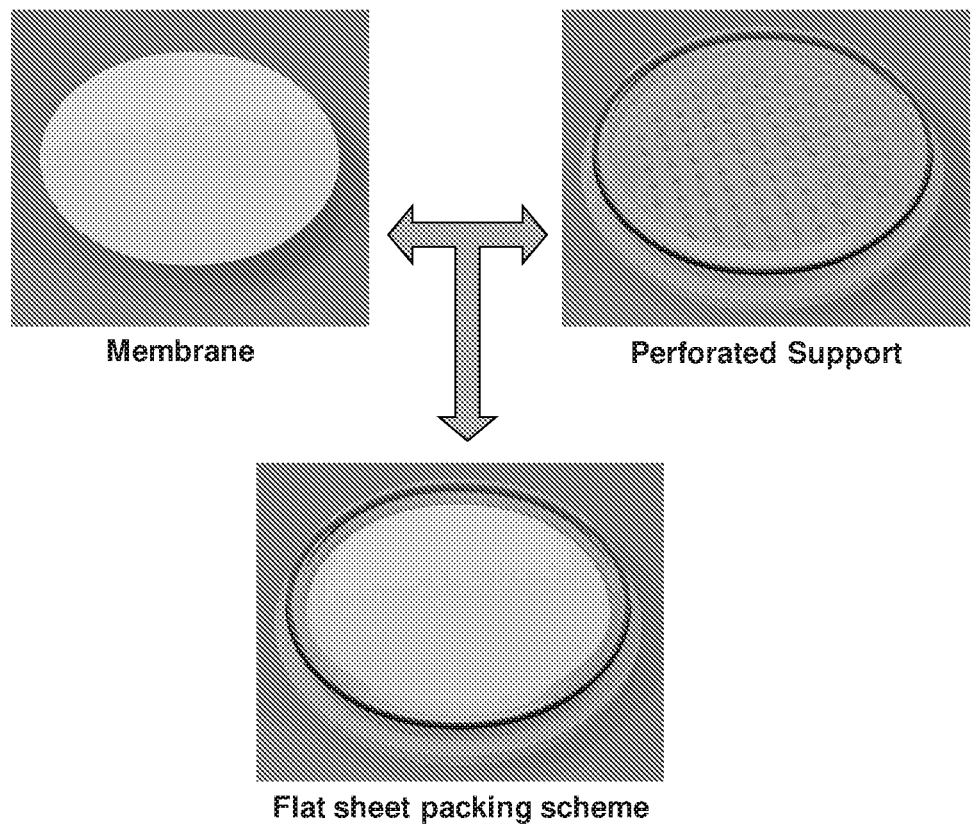
FIG. 19 shows images of a fabrication process of a membrane filter based on a flat sheet membrane packing scheme, according to an embodiment of the subject invention.

Referring to FIG. 19, a process for fabricating a membrane filter based on the flat sheet packing scheme is illustrated. A piece of membrane coupon is taped to a perforated support and fixed with an adhesive agent such as epoxy glue. Although the flat sheet packing scheme is limited by its small active membrane area, the membrane can be easily assembled and can be operated under gravity driven filtration conditions. Thus, the design is feasible for filter installations in household, provided that the membrane utilized having permeability greater than or equal to about 3000 $L/m^2/h/MPa$. The flat sheet packing scheme will be employed for testing filtration efficiency in other exemplary experiments as discussed below.

It is possible to install multiple pieces of membranes in a series manner to increase the treatment efficiency and breakthrough capacity of the filter. The flat sheet packing scheme offers the advantage of easy cleaning and regeneration.

B2. Twisted Corrugated Packing Scheme

Figure 20:
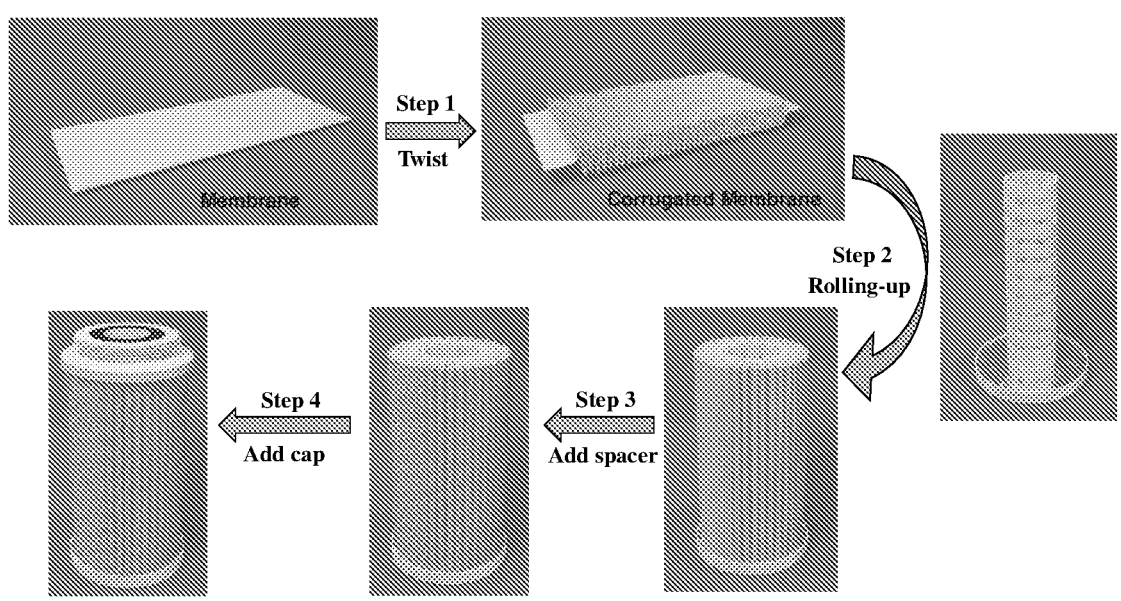
FIG. 20 shows images of a fabrication process of a membrane filter based on a twisted corrugated membrane packing scheme, according to an embodiment of the subject invention.

FIG. 20 shows a process for fabricating a membrane filter based on the twisted corrugated packing scheme. First, a flat membrane is folded to form a corrugated membrane which is glued and taped to a perforated tube with a length of, for example, about 10 cm and a diameter of, for example, about 1.6 cm. The membrane leaf is rolled up and then wrapped with an outer-wrap spacer. Further, an adhesive agent such as epoxy glue is applied to seal the membrane leaf with caps.

Comparing with the flat sheet packing scheme, the twisted corrugated packing scheme is slightly more complicated, but can be easily implemented in typical industrial production lines. The twisted corrugated packing scheme has an advantage of having a higher packed membrane area. In one embodiment, a total membrane area of about 960 $cm^2$ can be obtained for a filter, making the twisted corrugated packing scheme suitable for applications requiring high throughput in purification of large quantities of water.

B3. Spiral Wound Packing Scheme

Figure 21:
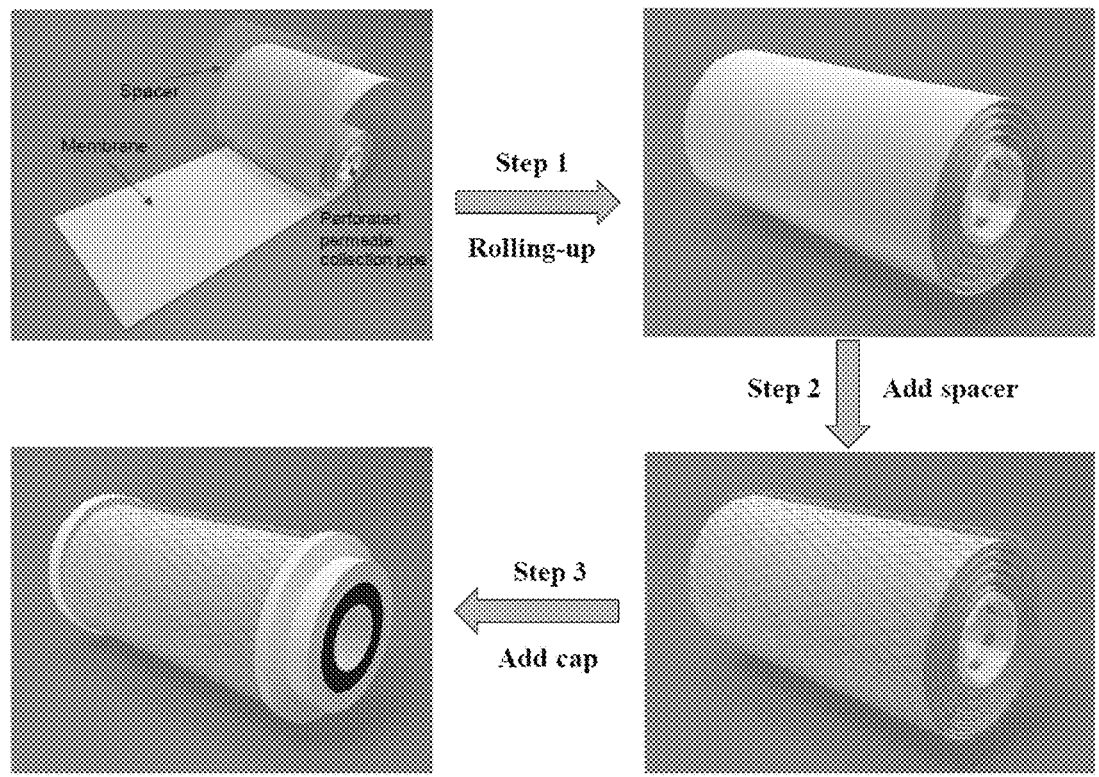
FIG. 21 shows images of a fabrication process of a membrane filter based on a spiral wound membrane packing scheme, according to an embodiment of the subject invention.

Referring to FIG. 21, the spiral wound packing as illustrated can comprise spiral-wound nanofibrous membrane layers/leaves and a permeate spacer inserted between adjacent membrane leaves. The leaves are then rolled around a permeate collection tube to form a compact membrane element. The compact membrane element is next wrapped with a perforated spacer and the two ends of the membrane element are sealed by end caps. When the water having impurities pass through the membrane, the filtered water is collected by the permeate tube.

In one embodiment, two leaves can be packed with a total effective membrane area of about 160 $cm^2$ which is much less than that of the twisted corrugated packing scheme. Considering the additional disadvantages of the more complicated installation and difficulties involved in cleaning and regeneration, the scheme spiral wound packing is less preferred.

According to an analysis of factors including membrane packing densities, ease of manufacturing, and ease of cleaning and regeneration, two of the three membrane packing schemes, namely, the flat sheet packing and the twisted corrugated packing scheme are determined to be optimal and thus are selected for further investigations.

C. Prototypes of Preliminary Water Filters

Three filter prototypes, namely, a gravity-driven household filtration kettle, a foldable filtration bottle, and a tap water filter that are based on the embodiments of the subject invention are discussed below.

C1. Gravity-driven Household Filtration Kettle

Figure 22:
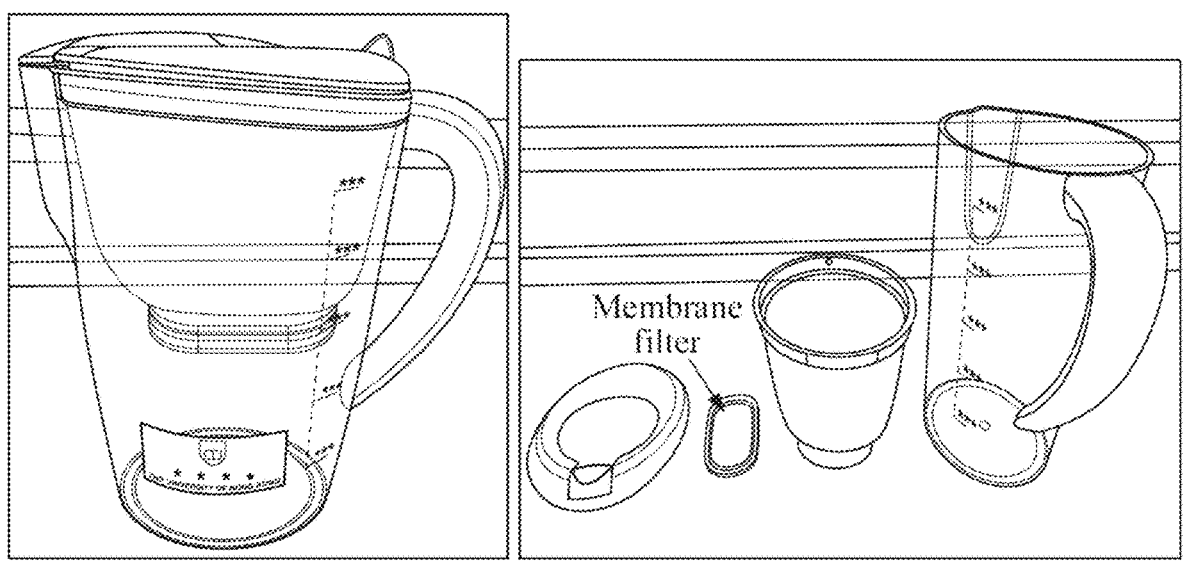
FIG. 22 shows images of a prototype of a gravity-driven household filtration kettle, according to an embodiment of the subject invention.

Referring to FIG. 22, the gravity-driven filtration kettle generates clean water without requirements of chemicals addition, pressurization or electricity. It includes a flat sheet filter cell as shown in FIG. 19, a feed container and a water receiver. The volumes of the feed container and receiver are in a range of about 0.5 L to about 1.5 L; the effective membrane filtration area is about 32 $cm^2$; and the throughput and removal efficiency are summarized in section C4 "filter throughput and removal efficiency" below.

C2. Foldable Filtration Bottle

Figure 23:
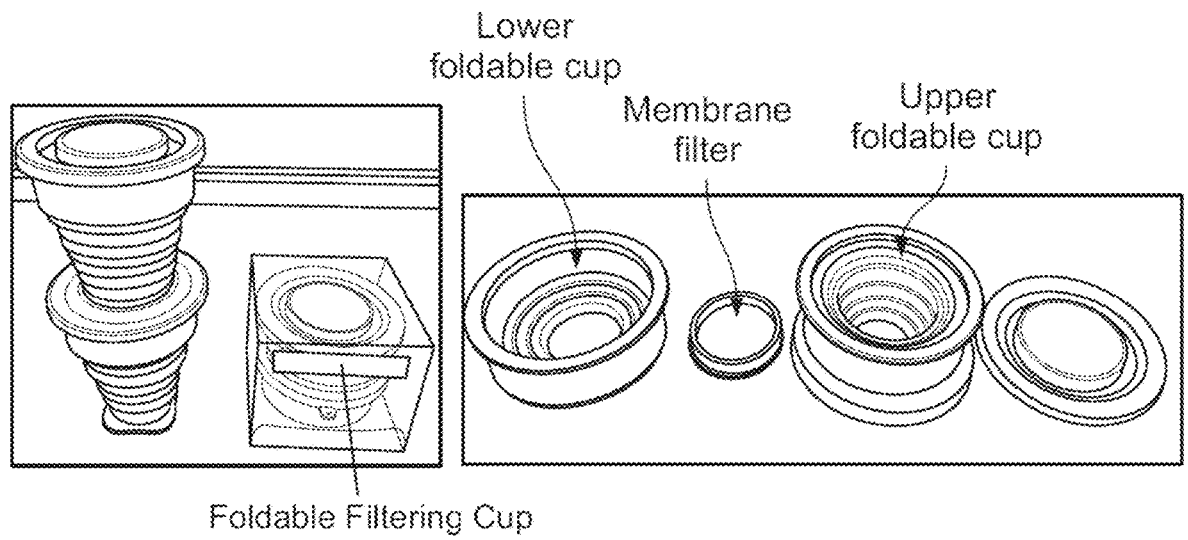
FIG. 23 shows images of a prototype of a foldable filtration bottle, according to an embodiment of the subject invention.

In FIG. 23, an image of a prototype of the foldable filtration bottle and its components is shown. The foldable filtration bottle comprises an upper foldable rubber cup for holding feed water, a lower foldable rubber cup for receiving purified water, and a membrane filter having an effective filtration area of about 7 cm$^2$ that can be easily clipped into the upper foldable cup. A partial vacuum can be generated in the lower cup by stretching this cup to unfold, which greatly accelerates the water filtration rate. The filter does not require any electricity or mechanical pumping, providing a convenient solution for travelers and disaster relief as well.

C3. Tap Water Filter

Figure 24:
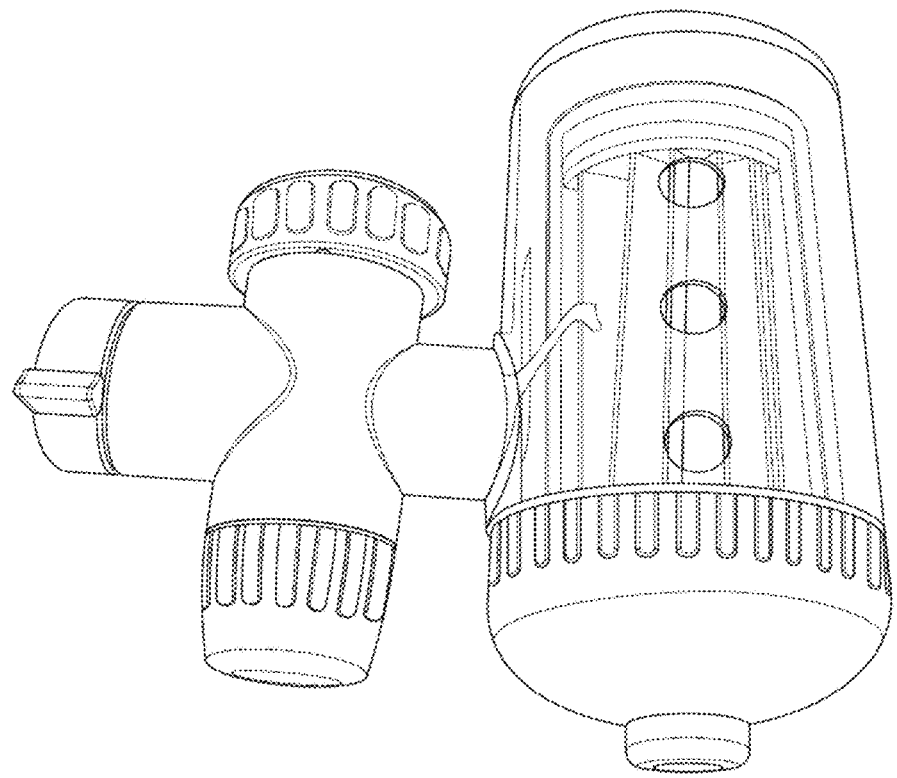
FIG. 24 shows images of a prototype of a tap water filter, according to an embodiment of the subject invention.

FIG. 24 shows an image of a prototype of the inline tap water filter. The twisted corrugated membrane packing scheme is selected for this filter to increase effective filtration area. Further, the household tap water is generally pressurized with a pressure of about 3-5 bar which is an equivalent of 30-50 m water height, greatly accelerating the filtration rate of the filter.

C4. Filter Throughput and Removal Efficiency

Figure 25A:
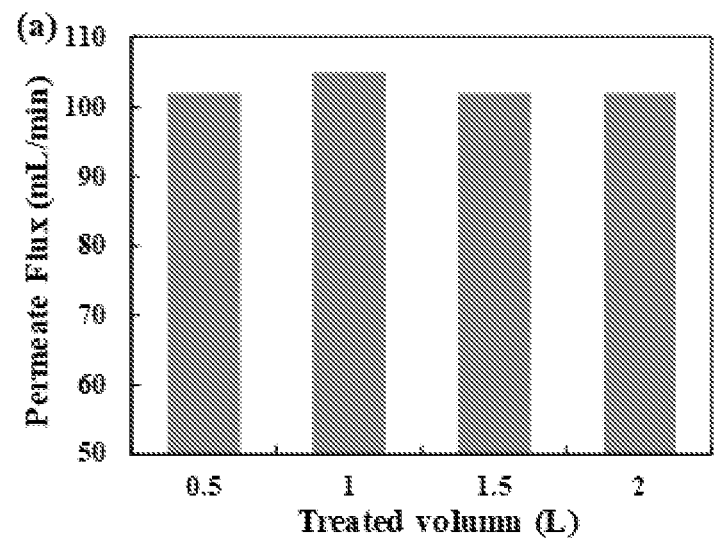
FIG. 25A is a bar diagram showing performance of the gravity-driven household filtration kettle with respect to water flux and FIG. 25B is a bar diagram showing performance of the gravity-driven household filtration kettle with respect to removal efficiency of heavy metals, according to an embodiment of the subject invention.
Figure 25B:
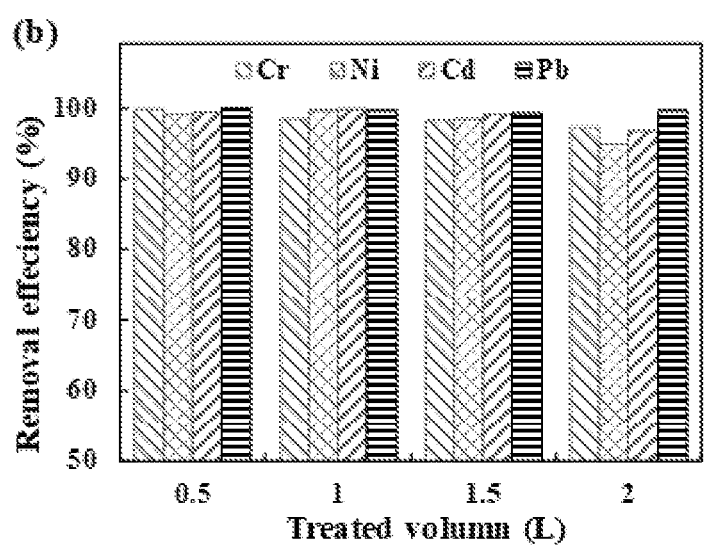

Referring to FIGS. 25A-25B, the results of throughput and heavy metals removal efficiency tests of the gravity-driven household filtration kettle is shown. The membrane gives a water production of about 0.1 L/min under only gravity. The removal efficiency of each of Pb, Cd, Cr, and Ni is greater than 99% when treating 1.5 L water. By enhancing the membrane packing density and effective filtration area, higher water throughput and longer durability for the removal of heavy metals can be obtained.

The removal of heavy metals by two commercial water filtration kettles are also characterized and compared with the filter based on the embodiments of the subject invention as shown in Table 5.

TABLE 5

Comparison Between the Gravity-driven Filter That is Based on Embodiments of Subject Invention and Commercial Water Filter with Respect to Removal of Heavy Metals

|  | Pb$^{2+}$ | Cc$^{2+}$ | Ni$^{2+}$ | Cr$^{3+}$ |
| --- | --- | --- | --- | --- |
| Feed solution, (µg/L) | 50 | 50 | 50 | 50 |
|  | Residual heavy metal concentration after filtration | | | |
| Gravity Driven Filter | <0.05 | <0.05 | <0.05 | <0.05 |
| Commercial product #1 | 32.4 | 3.2 | 10.1 | 17.6 |
| Commercial product #2 | 9.9 | 1.6 | 5.0 | 5.7 |
| WHO standard, (µg/L) | 10 | 3 | 70 | 50 |

The residual heavy metal concentrations after filtration by the two commercial products (in some results, exceeding the WHO standard for drinking water) are much higher than that after filtration by the filter based on the embodiments of the subject invention. For comparison, the filter based on the embodiments of the subject invention gives the best performance with all residual concentration of heavy metals lower than 0.05 µg/L, which is much lower than the WHO limit.

D. Implementation of Additional Filter Driving Mechanism

Figure 26:
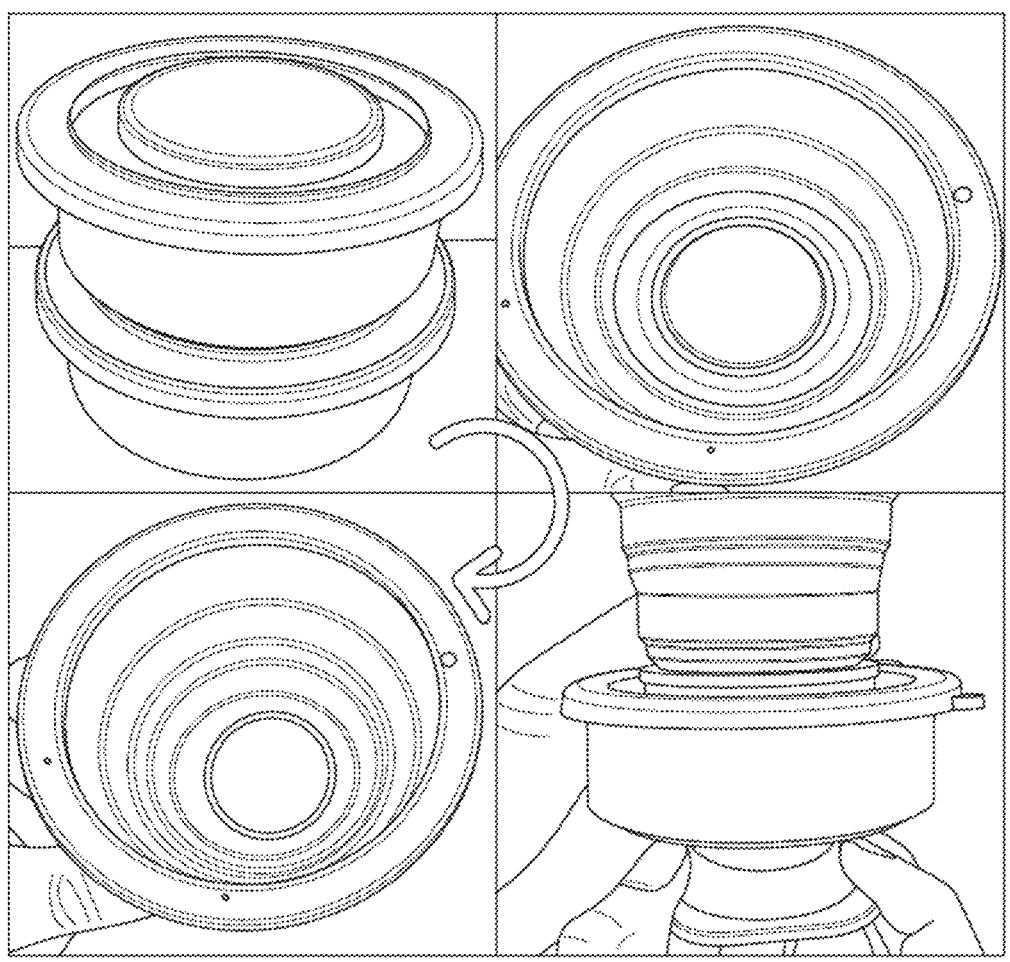
FIG. 26 shows images of a prototype of a partial vacuum assisted foldable filtration bottle, according to an embodiment of the subject invention.
Figure 27A:
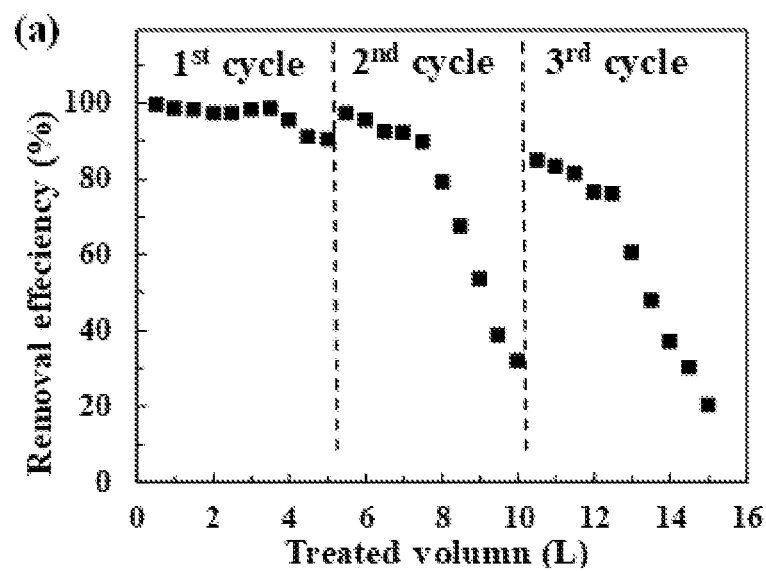
FIGS. 27A-27D are plot diagrams showing removal efficiencies of (a) Cr, (b) Ni, (c) Cd, and (d) Pb with different treated volume at 3 cycles, at experimental conditions: initial concentration of 50 μg/L for each heavy metal, 1 stacked PVA/PSSNa membrane coupons using the gravity-driven filtration kettle, according to an embodiment of the subject invention.
Figure 27B:
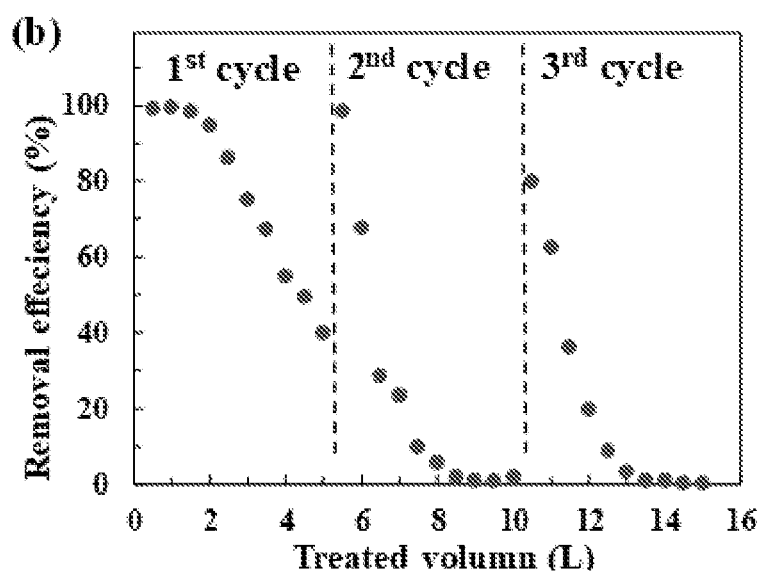
Figure 27C:
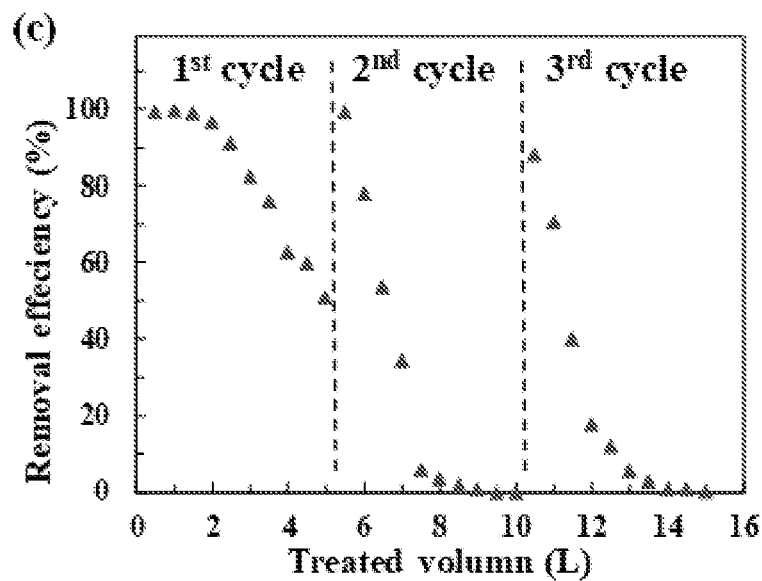
Figure 27D:
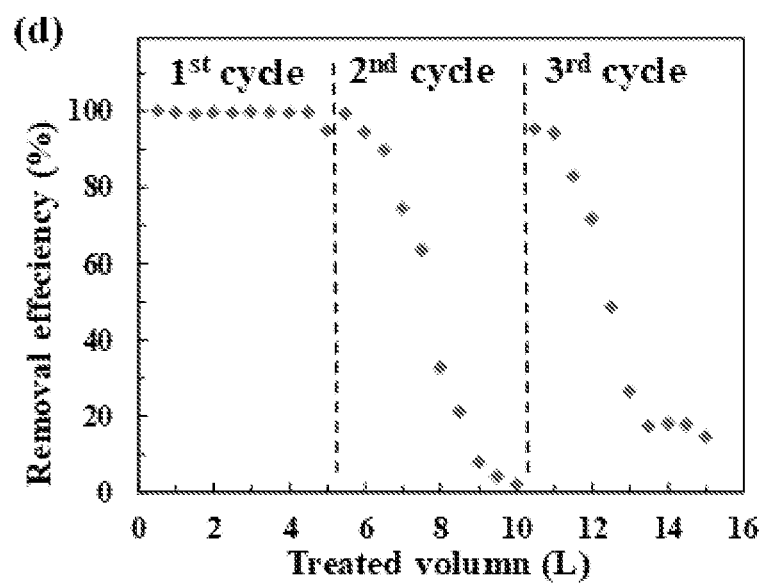

FIG. 26 shows implementation of partial vacuum to accelerate the filtration rate of the foldable filtration bottle based on an embodiment of the subject invention. The bottle can achieve a filtration rate of about 0.02-0.03 L/min under a gravity-driven condition. By pulling the lower foldable rubber cup, a partial vacuum can be generated in the lower rubber cup. The partial vacuum significantly accelerates the filtration rate to about 0.1-0.15 L/min which is a 5-time enhancement compared to that of the gravity-driven filtration.

In comparison with the foldable compact filter, the inline tap filter of the embodiment of the subject invention takes an advantage of the outlet pressure of tap water, achieving an enhancement that is greater than 100 times in throughput. Combined with the inline tap filter's greater membrane area, 1 L of filtered water can be processed within less than a minute.

E. Filter Regeneration Method

The nanostructured composite membrane filter can be easily regenerated by immersion and elution in a solution such as vinegar, citric acid or ethanol.

In one embodiment, the acetic acid such as white vinegar is selected as the desorption solution for exchanging metal ions with H$^+$. The used membrane filter in the gravity-driven filtration kettle is soaked in a hot vinegar solution at about 70° C. for about 12 hours. The filter is then rinsed with distilled water to neutralize the pH of rinsing solution. FIGS. 27A-27D show the heavy metal removal efficiency by the PVA/PSSNa membrane filters for Cr, Ni, Cd and Pb ions over 3 cycles of removal and filter regeneration. The removal efficiency gradually decreases in the consecutive cycles, which may be caused by gradual deterioration of active sites during adsorption/desorption cycles as well as imperfect recovery of adsorption sites in the regeneration process.

However, the removal efficiency is maintained as high as 85%, 80%, 88% and 95% after 3 filtration cycles for Cr, Ni, Cd and Pb, respectively. The results indicate that the electrospun PVA/PSSNa membranes possessed reasonably good reusability and could be regenerated or recycled for multiple times for water purification.

The nanostructured composite membrane filter for water purification of the subject invention can be utilized for inactivation of bacteria, retention of suspended solids and removal of pollutants including both organic pollutants and heavy metals with a high throughput and at low costs.

Exemplary Embodiments

Embodiment 1. A nanostructured composite membrane for purifying water, comprising:
  a silver layer comprising a plurality of silver functionalized nanofibers for disinfecting water in which there are microorganisms; and
  a chemical modified layer comprising a plurality of chemical modified nanofibers for removing impurities from the water.

Embodiment 2. The nanostructured composite membrane according to Embodiment 1, wherein the plurality of silver functionalized nanofibers comprises a plurality of polyvinyl alcohol (PVA) nanofibers coated with polydopamine (PDA) and silver.

Embodiment 3. The nanostructured composite membrane according to Embodiment 1 or Embodiment 2, wherein each of the plurality of chemical modified nanofibers comprises a polymer matrix and anionic polyelectrolytes for capturing metal ions from the water.

Embodiment 4. The nanostructured composite membrane according to any of Embodiments 1-3, wherein the anionic polyelectrolytes are poly(sodium styrenesulfonate) (PSSNa).

Embodiment 5. The nanostructured composite membrane according to any of Embodiments 1-4, wherein the polymer matrix is polyvinyl alcohol (PVA).

Embodiment 6. The nanostructured composite membrane according to any of Embodiments 1-5, wherein each of the plurality of chemical modified nanofibers comprises a plurality of surfaces coated with surface functional groups including sulfonate and hydroxyl for metal adsorption.

Embodiment 7. The nanostructured composite membrane according to any of Embodiments 1-6, wherein the silver is formed as silver nanoparticles.

Embodiment 8. The nanostructured composite membrane according to any of Embodiments 1-7, wherein the plurality of chemical modified nanofibers has an average fiber diameter in a range of 320-480 nm and a porous structure with random fiber orientations.

Embodiment 9. A method for preparing a nanostructured composite membrane filter for purifying water, the method comprising:
 preparing a silver layer comprising a plurality of silver functionalized nanofibers for disinfecting water in which there are microorganisms;
 preparing a chemical modified layer comprising a plurality of chemical modified nanofibers for removing impurities from the water; and
 forming a composite membrane filter comprising the prepared silver layer and the prepared chemical modified layer.

Embodiment 10. The method for preparing a nanostructured composite membrane filter according to Embodiment 9, wherein the preparing a silver layer comprises:
 forming a polyvinyl alcohol (PVA) nanofiberous membrane by electrospinning a PVA solution to a layer comprising a plurality of nanofibers; and
 adding silver onto surfaces of the PVA nanofiberous membrane by first coating the nanofibers with polydopamine (PDA) and then soaking the PDA coated membrane in a silver nitrate solution.

Embodiment 11. The method for preparing a nanostructured composite membrane filter according to Embodiment 9 or Embodiment 10, wherein the preparing a chemical modified layer comprises:
 preparing a polyvinyl alcohol (PVA)/poly(sodium styrenesulfonate) (PSSNa) solution;
 electrospinning the PVA/PSSNa solution onto surfaces of a layer of a plurality of nanofibers to produce a PVA/PSSNa nanofibrous membrane; and
 cross-linking the PVA/PSSNa nanofibrous membrane.

Embodiment 12. The method for preparing a nanostructured composite membrane filter according to any of Embodiments 9-11, wherein the forming a composite membrane filter comprises stacking the silver layer and the chemical modified layer to form the composite membrane filter.

Embodiment 13. The method for preparing a nanostructured composite membrane filter according to any of Embodiments 9-12, wherein the forming a composite membrane filter comprises electrospinning a polyvinyl alcohol (PVA)/poly(sodium styrenesulfonate) (PSSNa) solution onto surfaces of the silver layer to form the composite membrane filter.

Embodiment 14. The method for preparing a nanostructured composite membrane filter according to any of Embodiments 9-13, wherein the preparing a polyvinyl alcohol (PVA)/poly(sodium styrenesulfonate) (PSSNa) solution comprises:
 preparing a homogeneous solution of PVA and PSSNa in water at about 90° C.; and
 preparing a dope solution having about 10 wt % PVA with a predetermined mass ratio of PVA and PSSNa.

Embodiment 15. The method for preparing a nanostructured composite membrane filter according to any of Embodiments 9-14, wherein the predetermined mass ratio of PVA and PSSNa is 5/1, 3/1, or 2/1.

Embodiment 16. The method for preparing a nanostructured composite membrane filter according to any of Embodiments 9-15, wherein each of the plurality of chemical modified nanofibers comprises a plurality of surfaces coated with surface functional groups including sulfonate and hydroxyl for metal adsorption.

Embodiment 17. The method for preparing a nanostructured composite membrane filter according to any of Embodiments 9-16, wherein the plurality of chemical modified nanofibers has an average fiber diameter in a range of 320-480 nm and a porous structure with random fiber orientations.

Embodiment 18. The method for preparing a nanostructured composite membrane filter according to any of Embodiments 9-17, wherein the plurality of silver functionalized nanofibers comprises a plurality of polyvinyl alcohol (PVA) nanofibers coated with polydopamine (PDA) and silver.

Embodiment 19. The method for preparing a nanostructured composite membrane filter according to any of Embodiments 9-18, wherein the silver is formed as silver nanoparticles.

Embodiment 20. A method for producing a water filter system, comprising:
 obtaining a nanostructured composite membrane filter according to any of Embodiments 1-9; and
 packing the prepared nanostructured composite membrane filter according to a flat sheet packing scheme or a twisted corrugated packing scheme.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

We claim:

1. A method for preparing a nanostructured composite membrane filter for purifying water, the method comprising:
   preparing a silver layer comprising a plurality of silver functionalized nanofibers for disinfecting water in which there are microorganisms;
   preparing a chemical modified layer comprising a plurality of chemical modified nanofibers for removing impurities from the water; and
   forming a composite membrane filter comprising the prepared silver layer and the prepared chemical modified layer,
   wherein the preparing a chemical modified layer comprises preparing a polyvinyl alcohol (PVA)/poly(sodium styrenesulfonate) (PSSNa) solution that is a homogeneous solution of PVA and PSSNa in water at about 90° C.

2. The method for preparing a nanostructured composite membrane filter according to claim 1, wherein the preparing a silver layer comprises:
   forming a polyvinyl alcohol (PVA) nanofiberous membrane by electrospinning a PVA solution to a layer comprising a plurality of nanofibers; and
   adding silver onto surfaces of the PVA nanofiberous membrane by first coating the nanofibers with polydopamine (PDA) and then soaking the PDA coated membrane in a silver nitrate solution.

3. The method for preparing a nanostructured composite membrane filter according to claim 1, wherein the preparing a chemical modified layer comprises:
   electrospinning the PVA/PSSNa solution onto surfaces of a layer of a plurality of nanofibers to produce a PVA/PSSNa nanofibrous membrane; and
   cross-linking the PVA/PSSNa nanofibrous membrane.

4. The method for preparing a nanostructured composite membrane filter according to claim 1, wherein the forming a composite membrane filter comprises stacking the silver layer and the chemical modified layer to form the composite membrane filter.

5. The method for preparing a nanostructured composite membrane filter according to claim 1, wherein the forming a composite membrane filter comprises electrospinning a polyvinyl alcohol (PVA)/poly(sodium styrenesulfonate) (PSSNa) solution onto surfaces of the silver layer to form the composite membrane filter.

6. The method for preparing a nanostructured composite membrane filter according to claim 3, wherein the preparing a polyvinyl alcohol (PVA)/poly(sodium styrenesulfonate) (PSSNa) solution comprises:
   preparing a dope solution having about 10 wt % PVA with a predetermined mass ratio of PVA and PSSNa.

7. The method for preparing a nanostructured composite membrane filter according to claim 6, wherein the predetermined mass ratio of PVA and PSSNa is 5/1, 3/1, or 2/1.

8. The method for preparing a nanostructured composite membrane filter according to claim 1, wherein each of the plurality of chemical modified nanofibers comprises a plurality of surfaces coated with surface functional groups including sulfonate and hydroxyl for metal adsorption.

9. The method for preparing a nanostructured composite membrane filter according to claim 1, wherein the plurality of chemical modified nanofibers has an average fiber diameter in a range of 320-480 nm and a porous structure with random fiber orientations.

10. The method for preparing a nanostructured composite membrane filter according to claim 1, wherein the plurality of silver functionalized nanofibers comprises a plurality of polyvinyl alcohol (PVA) nanofibers coated with polydopamine (PDA) and silver.

11. The method for preparing a nanostructured composite membrane filter according to claim 1, wherein the silver layer comprises silver nanoparticles.

12. A method for preparing a nanostructured composite membrane filter for purifying water, the method comprising:
   preparing a silver layer comprising a plurality of silver functionalized nanofibers for disinfecting water in which there are microorganisms;
   preparing a chemical modified layer comprising a plurality of chemical modified nanofibers for removing impurities from the water; and
   forming a composite membrane filter comprising the prepared silver layer and the prepared chemical modified layer;
   wherein the preparing a chemical modified layer comprises:
   preparing a polyvinyl alcohol (PVA)/poly(sodium styrenesulfonate) (PSSNa) solution;
   electrospinning the PVA/PSSNa solution onto surfaces of a layer of a plurality of nanofibers to produce a PVA/PSSNa nanofibrous membrane; and
   cross-linking the PVA/PSSNa nanofibrous membrane;
   wherein the preparing a polyvinyl alcohol (PVA)/poly(sodium styrenesulfonate) (PSSNa) solution comprises:
   preparing a homogeneous solution of PVA and PSSNa in water at about 90° C.; and
   preparing a dope solution having about 10 wt % PVA with a predetermined mass ratio of PVA and PSSNa.

* * * * *